US011317675B2

(12) United States Patent
Hoffer et al.

(10) Patent No.: US 11,317,675 B2
(45) Date of Patent: May 3, 2022

(54) PARTICULATE FOAM WITH FLEXIBLE CASING

(71) Applicant: NIKE, Inc., Beaverton, OR (US)

(72) Inventors: Kevin W. Hoffer, Portland, OR (US); Scott C. Holt, Portland, OR (US); Jeffrey L. Johnson, Taichung (CN); Cassidy R. Levy, West Linn, OR (US); Nicholas R. Long, Portland, OR (US); Matthew C. Palmer, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 349 days.

(21) Appl. No.: 16/327,428

(22) PCT Filed: Sep. 23, 2016

(86) PCT No.: PCT/US2016/053256
§ 371 (c)(1),
(2) Date: Feb. 22, 2019

(87) PCT Pub. No.: WO2017/053665
PCT Pub. Date: Mar. 30, 2017

(65) Prior Publication Data
US 2019/0223551 A1 Jul. 25, 2019

Related U.S. Application Data

(60) Provisional application No. 62/222,842, filed on Sep. 24, 2015, provisional application No. 62/222,816, (Continued)

(51) Int. Cl.
*A43B 13/12* (2006.01)
*A43B 13/18* (2006.01)
(Continued)

(52) U.S. Cl.
CPC .......... *A43B 13/141* (2013.01); *A43B 1/0072* (2013.01); *A43B 5/00* (2013.01);
(Continued)

(58) Field of Classification Search
CPC ......... A43B 13/02; A43B 13/04; A43B 13/12; A43B 13/125; A43B 13/127; A43B 13/18; A43B 13/187; A43B 13/188
See application file for complete search history.

(56) References Cited

U.S. PATENT DOCUMENTS 2,930,149 A   3/1960   Hack
3,087,262 A   4/1963   Russell
(Continued)

FOREIGN PATENT DOCUMENTS

CH   283034 A    5/1952
CN   1053884 A   8/1991
(Continued)

OTHER PUBLICATIONS

European Patent Office, Communication pursuant to Article 94(3) EPC for EP Application No. 16777863.8, dated Apr. 15, 2020.
(Continued)

*Primary Examiner* — Sharon M Prange
(74) *Attorney, Agent, or Firm* — Honigman LLP; Matthew H. Szalach; Jonathan O'Brien

(57) ABSTRACT

An article of footwear includes an upper, a midsole attached to the upper, and an outsole. The midsole has a footbed and a bottom surface disposed on an opposite side of the midsole than the footbed. The outsole has a ground-engaging surface, an inner surface disposed on an opposite side of the outsole than the ground-engaging surface, and a wall extending from the ground-engaging surface and surrounding the outsole. The article of footwear also includes a casing containing particulate matter and having a length that is
(Continued)

greater than a length of the outsole. The casing includes a first fold at a predetermined location along its length. The casing is received within a cavity bounded by the wall of the outsole and between the bottom surface and the inner surface.

18 Claims, 16 Drawing Sheets

Related U.S. Application Data filed on Sep. 24, 2015, provisional application No. 62/222,832, filed on Sep. 24, 2015, provisional application No. 62/222,851, filed on Sep. 24, 2015, provisional application No. 62/222,873, filed on Sep. 24, 2015, provisional application No. 62/222,882, filed on Sep. 24, 2015.

(51) Int. Cl.
   | | |
   |---|---|
   | A43B 13/14 | (2006.01) |
   | A43B 13/20 | (2006.01) |
   | A43B 1/00 | (2006.01) |
   | A43B 13/04 | (2006.01) |
   | A43B 5/00 | (2022.01) |
   | A43B 13/16 | (2006.01) |
   | B32B 5/16 | (2006.01) |
   | B32B 5/18 | (2006.01) |
   | B32B 25/04 | (2006.01) |
   | B32B 25/14 | (2006.01) |
   | A43B 7/1405 | (2022.01) |
   | A43B 7/32 | (2006.01) |

(52) U.S. Cl.
   CPC ............... *A43B 7/141* (2013.01); *A43B 7/32* (2013.01); *A43B 13/04* (2013.01); *A43B 13/122* (2013.01); *A43B 13/125* (2013.01); *A43B 13/127* (2013.01); *A43B 13/16* (2013.01); *A43B 13/181* (2013.01); *A43B 13/186* (2013.01); *A43B 13/187* (2013.01); *A43B 13/188* (2013.01); *A43B 13/189* (2013.01); *A43B 13/20* (2013.01); *A43B 13/206* (2013.01); *B32B 5/16* (2013.01); *B32B 5/18* (2013.01); *B32B 25/047* (2013.01); *B32B 25/14* (2013.01); *B32B 2264/02* (2013.01); *B32B 2437/02* (2013.01)

(56) References Cited

U.S. PATENT DOCUMENTS

| | | | |
|---|---|---|---|
| 3,469,576 A | 9/1969 | Smith et al. | |
| 3,552,044 A | 1/1971 | Wiele | |
| 3,608,215 A | 9/1971 | Fukuoka | |
| 3,765,422 A | 10/1973 | Smith | |
| 3,906,570 A | 9/1975 | Revill | |
| 3,971,839 A | 7/1976 | Taylor | |
| 4,170,078 A * | 10/1979 | Moss | A43B 13/203 36/28 |
| 4,183,156 A * | 1/1980 | Rudy | A43B 17/035 36/29 |
| 4,219,945 A * | 9/1980 | Rudy | A43B 13/203 36/29 |
| 4,307,200 A | 12/1981 | Lichter et al. | |
| 4,343,047 A | 8/1982 | Lazowski et al. | |
| 4,345,387 A | 8/1982 | Daswick | |
| 4,524,529 A | 6/1985 | Schaefer | |
| 4,658,515 A * | 4/1987 | Oatman | A43B 17/14 36/2.6 |
| 4,686,781 A | 8/1987 | Bury | |
| 4,724,627 A | 2/1988 | Sisco | |
| 4,823,799 A | 4/1989 | Robbins | |
| 4,905,320 A * | 3/1990 | Squyers, Jr. | A41D 13/015 2/22 |
| 4,970,807 A | 11/1990 | Anderie et al. | |
| 5,005,575 A | 4/1991 | Geri | |
| 5,150,490 A | 9/1992 | Busch et al. | |
| 5,231,776 A | 8/1993 | Wagner | |
| 5,363,570 A | 11/1994 | Allen et al. | |
| 5,378,223 A | 1/1995 | Grim et al. | |
| 5,383,290 A | 1/1995 | Grim | |
| 5,392,534 A | 2/1995 | Grim | |
| 5,517,770 A | 5/1996 | Martin et al. | |
| 5,595,004 A * | 1/1997 | Lyden | A43B 13/20 36/153 |
| 5,617,650 A * | 4/1997 | Grim | A43B 7/147 36/154 |
| 5,665,285 A | 9/1997 | Hattori et al. | |
| 5,718,064 A | 2/1998 | Pyle | |
| 5,753,357 A | 5/1998 | Filipitsch et al. | |
| 5,758,435 A | 6/1998 | Miyata | |
| 5,920,915 A | 7/1999 | Bainbridge et al. | |
| 5,987,781 A | 11/1999 | Pavesi et al. | |
| 6,020,055 A | 2/2000 | Pearce | |
| 6,032,300 A | 3/2000 | Bainbridge et al. | |
| 6,061,928 A | 5/2000 | Nichols | |
| 6,098,209 A | 8/2000 | Bainbridge et al. | |
| 6,158,149 A | 12/2000 | Rudy | |
| 6,266,896 B1 | 7/2001 | Liu | |
| D460,852 S | 7/2002 | Daudier | |
| 6,453,477 B1 * | 9/2002 | Bainbridge | A41D 13/015 2/455 |
| 6,502,331 B2 | 1/2003 | Hines | |
| 6,532,689 B1 | 3/2003 | Jones, Jr. | |
| 6,635,203 B2 | 10/2003 | Monaci | |
| 6,759,443 B2 | 7/2004 | Brant et al. | |
| 6,782,640 B2 | 8/2004 | Westin | |
| 6,848,200 B1 | 2/2005 | Westin | |
| 6,878,753 B1 | 4/2005 | Takemura et al. | |
| 7,037,571 B2 | 5/2006 | Fish et al. | |
| 7,069,672 B2 * | 7/2006 | Hahn | A43B 1/0045 36/141 |
| 7,152,342 B2 | 12/2006 | Sommer | |
| 7,484,318 B2 | 2/2009 | Finkelstein | |
| 7,555,851 B2 | 7/2009 | Hazenberg et al. | |
| 7,594,344 B2 | 9/2009 | Mizrahi | |
| 7,805,859 B2 | 10/2010 | Finkelstein | |
| 7,823,238 B2 | 11/2010 | Din Mahamed | |
| 7,904,971 B2 | 3/2011 | Doria et al. | |
| 8,091,254 B2 | 1/2012 | Wang | |
| 8,178,022 B2 | 5/2012 | Schindler et al. | |
| 8,272,149 B2 | 9/2012 | Cooper et al. | |
| 8,671,591 B2 * | 3/2014 | Brown | A43B 7/146 36/43 |
| 8,713,817 B2 | 5/2014 | Litchfield et al. | |
| 2001/0000835 A1 | 5/2001 | Hines | |
| 2003/0046831 A1 | 3/2003 | Westin | |
| 2005/0022424 A1 | 2/2005 | Held | |
| 2005/0086728 A1 | 4/2005 | Tobergte | |
| 2005/0150132 A1 | 7/2005 | Iannacone | |
| 2006/0010717 A1 | 1/2006 | Finkelstein | |
| 2006/0026863 A1 | 2/2006 | Liu | |
| 2006/0130363 A1 | 6/2006 | Hottinger | |
| 2007/0051018 A1 | 3/2007 | Issler | |
| 2007/0169379 A1 | 7/2007 | Hazenberg et al. | |
| 2008/0066341 A1 | 3/2008 | Hottinger | |
| 2008/0148599 A1 * | 6/2008 | Collins | B29D 35/142 36/44 |
| 2008/0230956 A1 | 9/2008 | Allmendinger et al. | |
| 2009/0094855 A1 | 4/2009 | Finkelstein | |
| 2009/0313853 A1 | 12/2009 | Tadin | |
| 2010/0011618 A1 | 1/2010 | Bitton | |
| 2010/0047550 A1 | 2/2010 | Prissok et al. | |
| 2010/0154252 A1 | 6/2010 | Avent et al. | |
| 2010/0222442 A1 | 9/2010 | Prissok et al. | |
| 2010/0251565 A1 | 10/2010 | Litchfield et al. | |
| 2011/0016747 A1 | 1/2011 | Bitton | |
| 2011/0215497 A1 | 9/2011 | McEvoy et al. | |
| 2012/0036698 A1 | 2/2012 | Guertin | |
| 2012/0073163 A1 | 3/2012 | Tse | |

(56) References Cited

U.S. PATENT DOCUMENTS

| | | | |
|---|---|---|---|
| 2012/0204451 | A1 | 8/2012 | De Roode et al. |
| 2012/0210602 | A1 | 8/2012 | Brown |
| 2013/0008050 | A1 | 1/2013 | Marc |
| 2013/0145653 | A1 | 6/2013 | Bradford |
| 2013/0212909 | A1* | 8/2013 | Bates ................. A43B 13/188 36/102 |
| 2013/0247422 | A1 | 9/2013 | Holt et al. |
| 2014/0007456 | A1* | 1/2014 | Tadin ................. A43B 7/1465 36/43 |
| 2014/0151918 | A1 | 6/2014 | Hartmann |
| 2014/0223776 | A1 | 8/2014 | Wardlaw et al. |
| 2014/0223777 | A1 | 8/2014 | Whiteman et al. |
| 2014/0283413 | A1 | 9/2014 | Christensen et al. |
| 2015/0196085 | A1 | 7/2015 | Westmoreland et al. |
| 2015/0223564 | A1 | 8/2015 | Peyton et al. |
| 2015/0257481 | A1 | 9/2015 | Campos, II et al. |
| 2016/0073732 | A1 | 3/2016 | Ernst et al. |
| 2016/0120262 | A1* | 5/2016 | Cortez ................. A43B 13/12 12/146 B |
| 2017/0055636 | A1 | 3/2017 | Campos, II et al. |
| 2018/0132564 | A1 | 5/2018 | Bruce et al. |
| 2019/0343225 | A1 | 11/2019 | Reddy et al. |

FOREIGN PATENT DOCUMENTS

| | | |
|---|---|---|
| CN | 1211901 A | 3/1999 |
| CN | 2620493 Y | 6/2004 |
| CN | 2888936 Y | 4/2007 |
| CN | 202051034 U | 11/2011 |
| CN | 202145956 U | 2/2012 |
| CN | 103141993 A | 6/2013 |
| CN | 103720129 A | 4/2014 |
| CN | 104010541 A | 8/2014 |
| CN | 104203029 A | 12/2014 |
| CN | 104363783 A | 2/2015 |
| CN | 104490008 A | 4/2015 |
| DE | 2907506 A1 | 9/1980 |
| DE | 3406504 A1 | 8/1985 |
| DE | 3627538 A1 | 2/1988 |
| DE | 3723549 A1 | 2/1988 |
| DE | 3406504 C2 | 1/1990 |
| DE | 3839747 A1 | 5/1990 |
| DE | 3905989 C2 | 1/1991 |
| DE | 4202159 A1 | 7/1993 |
| DE | 4401282 A1 | 12/1994 |
| DE | 4446252 A1 | 6/1995 |
| DE | 19708622 A1 | 9/1997 |
| DE | 19938609 A1 | 3/2001 |
| DE | 10138426 C1 | 12/2002 |
| DE | 102009009589 A1 | 9/2010 |
| DE | 102010046278 A1 | 2/2011 |
| DE | 202016104626 U1 | 10/2016 |
| EP | 0007948 A1 | 2/1980 |
| EP | 130816 A2 | 1/1985 |
| EP | 316289 A2 | 5/1989 |
| EP | 0359699 A1 | 3/1990 |
| EP | 0383685 A1 | 8/1990 |
| EP | 529941 A1 | 3/1993 |
| EP | 2609824 A1 | 7/2013 |
| EP | 2649896 B1 | 10/2016 |
| EP | 3386334 A1 | 10/2018 |
| FR | 996111 A | 12/1951 |
| FR | 1018215 A | 12/1952 |
| FR | 2824884 A1 | 11/2002 |
| GB | 1301147 A | 12/1972 |
| GB | 2066049 A | 7/1981 |
| GB | 2462100 A | 1/2010 |
| JP | S56-080702 U | 6/1981 |
| JP | H02-121601 A | 5/1990 |
| JP | H05-37104 U | 5/1993 |
| JP | H0723804 A | 1/1995 |
| JP | H0739404 A | 2/1995 |
| JP | 3042853 U | 11/1997 |
| JP | H11-32806 A | 2/1999 |
| JP | 2000316606 A | 11/2000 |
| JP | 2002306280 A | 10/2002 |
| JP | 2009056007 A | 3/2009 |
| JP | 2015513354 A | 5/2015 |
| KR | 19990069793 A | 9/1999 |
| KR | 100230096 B1 | 11/1999 |
| KR | 200374026 Y1 | 1/2005 |
| KR | 20100086227 A | 7/2010 |
| KR | 20120033710 A | 4/2012 |
| WO | WO-1997035496 A1 | 10/1997 |
| WO | WO-9947014 A1 | 9/1999 |
| WO | WO-2006049401 A1 * | 5/2006 ........... A43B 13/181 |
| WO | WO-2008012809 A2 | 1/2008 |
| WO | WO-2012177957 A2 | 12/2012 |
| WO | WO-2013013784 A1 | 1/2013 |
| WO | WO-2014126799 A1 | 8/2014 |
| WO | WO-2015/065578 A1 | 5/2015 |
| WO | WO-2018169535 A1 | 9/2018 |
| WO | WO-2018175734 A1 | 9/2018 |
| WO | WO-2020125963 A1 | 6/2020 |

OTHER PUBLICATIONS

Japan Patent Office, Decision of Rejection for JP Application No. 2018-515812, dated Apr. 6, 2020.
European Patent Office, Extended European Search Report for EP Application No. 19212921.1, dated Mar. 31, 2020.
European Patent Office, Communication pursuant to Article 94(3) EPC for EP Application No. 16777865.3, dated Apr. 20, 2020.
Korean Intellectual Property Office, Office Action for KR Application No. 10-2020-7003423, dated Apr. 21, 2020.
Japan Patent Office, Notice of Reasons for Rejection for JP Application No. 2018-515812 dated Jul. 29, 2019.
Japan Patent Office, Notice of Reasons for Rejection for JP Application No. 2018-515822 dated Jul. 22, 2019.
Japan Patent Office, Notice of Reasons for Rejection for JP Application No. 2018-515842 dated Aug. 5, 2019.
Japan Patent Office, Notice of Reasons for Rejection for JP Application No. 2018-515825 dated Jul. 22, 2019.
Japan Patent Office, Notice of Reasons for Rejection for JP Application No. 2018-515843 dated Aug. 5, 2019.
Japan Patent Office, Notice of Reasons for Rejection for JP Application No. 2018-515828 dated Jul. 22, 2019.
Taiwan Intellectual Property Office, Search Report for TW Application No. 105130844 dated Aug. 27, 2019.
European Patent Office (ISA), International Search Report and Written Opinion for PCT Application No. PCT/US2017/022651, dated Oct. 25, 2017.
European Patent Office (ISA), International Search Report and Written Opinion for PCT Application No. PCT/US2017/022647, dated Nov. 2, 2017.
European Patent Office as the International Searching Authority, International Search Report and Written Opinion for PCT Application No. PCT/US2016/053256, dated Jan. 12, 2017.
European Patent Office as the International Searching Authority, International Search Report and Written Opinion for PCT Application No. PCT/US2016/053240, dated Jan. 3, 2017.
European Patent Office as the International Searching Authority, International Search Report and Written Opinion for PCT Application No. PCT/US2016/053260, dated Dec. 15, 2016.
European Patent Office as the International Searching Authority, International Search Report and Written Opinion for PCT Application No. PCT/US2016/053232, dated Jan. 10, 2017.
European Patent Office as the International Searching Authority, International Search Report and Written Opinion for PCT Application No. PCT/US2016/053246, dated Jan. 10, 2017.
European Patent Office as the International Searching Authority, International Search Report and Written Opinion for PCT Application No. PCT/US2016/053265, dated Dec. 20, 2016.
United States Patent and Trademark Office, Office Action for U.S. Appl. No. 15/816,270, dated Apr. 17, 2018.
United States Patent and Trademark Office, Office Action for U.S. Appl. No. 15/816,200, dated Apr. 18, 2018.

(56) References Cited

OTHER PUBLICATIONS

European Patent Office (ISA), International Preliminary Report on Patentability for International Application No. PCT/US2017/022651, dated Sep. 26, 2019.
European Patent Office (ISA), International Preliminary Report on Patentability for International Application No. PCT/US2017/022647, dated Sep. 26, 2019.
United States Patent and Trademark Office, Office Action for U.S. Appl. No. 15/574,700, dated Oct. 22, 2019.
Korean Intellectual Property Office, Office Action for KR Application No. 10-2019-7036063, dated Feb. 7, 2020.
China National Intellectual Property Office, Office Action for CN Application No. 201680066156.7, dated Jan. 22, 2020.
China National Intellectual Property Office, Office Action and Search Report for CN Application No. 201680062323.0, dated Mar. 4, 2020.
China National Intellectual Property Office, Office Action and Search Report for CN Application No. 201680062231.2, dated Mar. 24, 2020.
China National Intellectual Property Office, Office Action for CN Application No. 201680066534.1, dated Mar. 26, 2020.
China National Intellectual Property Office, Office Action and Search Report for CN Application No. 201680062300.X, dated Mar. 12, 2020.
European Patent Office, Communication pursuant to Article 94(3) EPC for EP Application No. 16777864.6, dated Apr. 7, 2020.
Korean Intellectual Property Office, Office Action for Application No. 10-2018-7011476, dated May 29, 2019.
Korean Intellectual Property Office, Office Action for Application No. 10-2018-7011477, dated May 29, 2019.
Korean Intellectual Property Office, Office Action for Application No. 10-2018-7011479, dated Jun. 4, 2019.
Korean Intellectual Property Office, Office Action for Application No. 10-2018-7011480, dated Jun. 10, 2019.
Korean Intellectual Property Office, Office Action for Application No. 10-2018-7011478, dated Jun. 4, 2019.
European Patent Office, Extended European Search Report for EP Application No. 19196682.9, dated Jan. 2, 2020.
China National Intellectual Property Office, Office Action for CN Application No. 201680062271.7, dated Feb. 3, 2020.
Korean Intellectual Property Office, Office Action for KR Application No. 10-2018-7011479, dated Dec. 26, 2019.
Korean Intellectual Property Office, Office Action for KR Application No. 10-2018-7011480, dated Jan. 21, 2020.
European Patent Office (ISA), International Search Report and Written Opinion for PCT Application No. PCT/US2020/042784, dated Sep. 17, 2020.
Ge, Chengbiao et al., Steam-chest molding of expanded thermoplastic polyurethane bead foams and their mechanical properties, Chemical Engineering Science 174 (2017) pp. 337-346.
Japan Patent Office, Notification of Reasons for Refusal for JP Application No. 2019-550843, dated Nov. 24, 2020.
European Patent Office, Communication pursuant to Article 94(3) EPC for EP Application No. 16777864.6, dated Dec. 16, 2020.
European Patent Office, Communication pursuant to Article 94(3) EPC for EP Application No. 16777863.8, dated Dec. 22, 2020.
KS65 Luxury Light Fescue—Field Green <http://www.kodiaksports.com/Artificial-Turf/Fake-Grass/Artificial-Grass-ST65_LFS_Field, Oct. 12, 2013, (Oct. 12, 2013), Retrieved from internet: URL:https://web.archive.org/web/*/http://www.kodiaksports.com/core/media/media.nl/id.28351/c.1268496/.f?h=1c04c87e9fd3f9d67f24 [retrieved on Dec. 15, 2016].
European Patent Office as the International Searching Authority, International Search Report and Written Opinion for PCT Application No. PCT/US2020/042735, dated Sep. 16, 2020.
European Patent Office as the International Searching Authority, International Search Report and Written Opinion for PCT Application No. PCT/US2020/042784, dated Sep. 17, 2020.
European Patent Office as the International Searching Authority, International Search Report and Written Opinion for PCT Application No. PCT/US2020/042807, dated Sep. 16, 2020.

\* cited by examiner

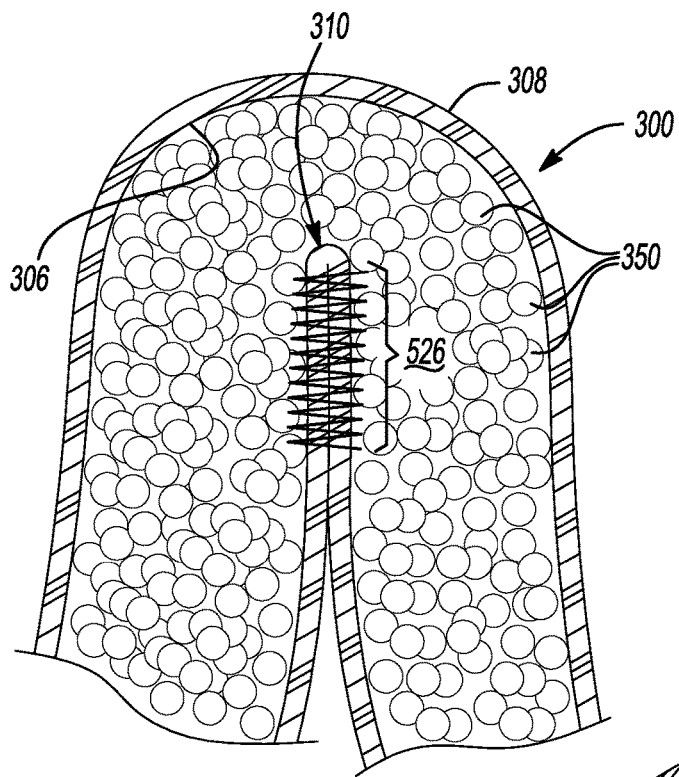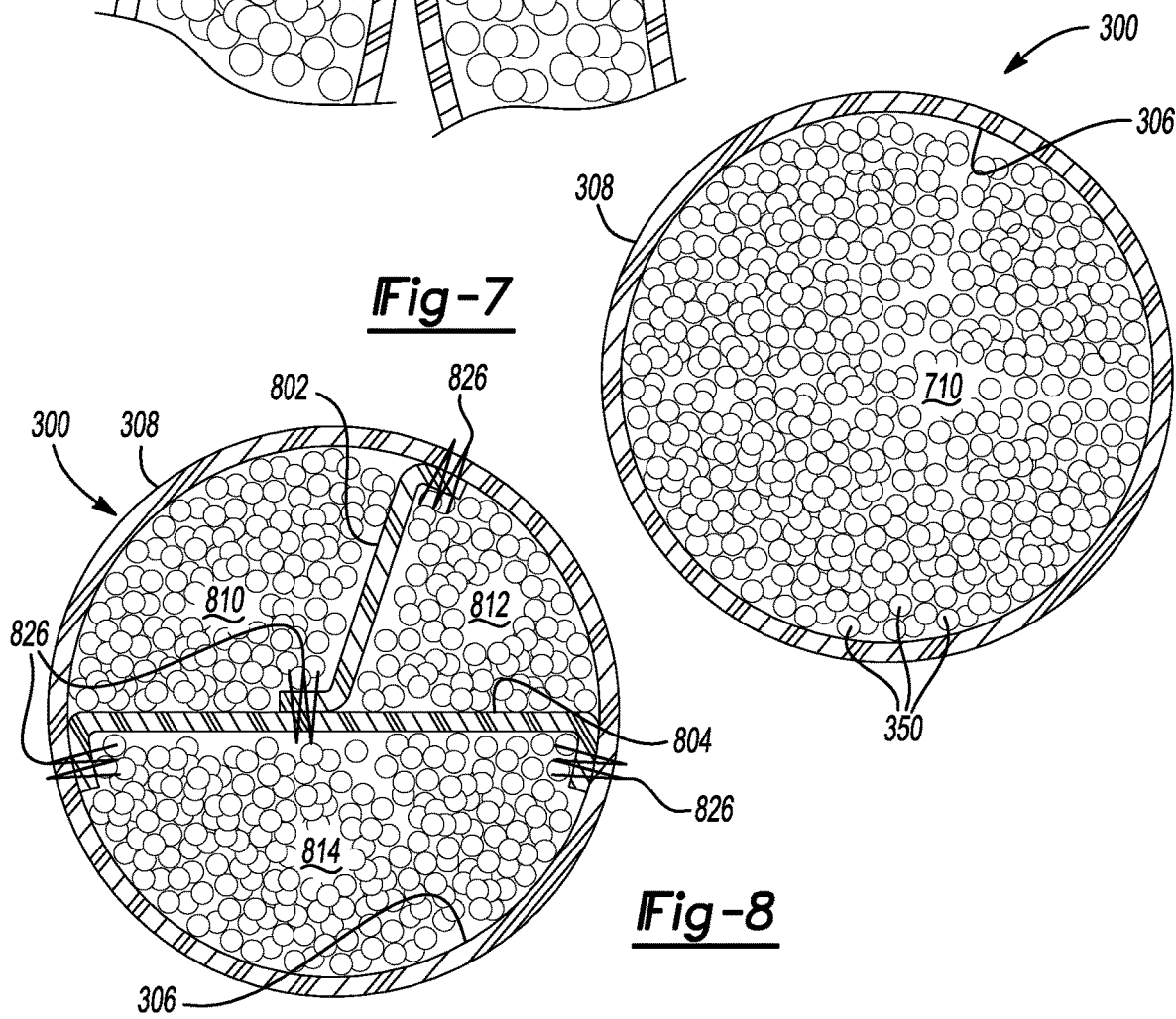

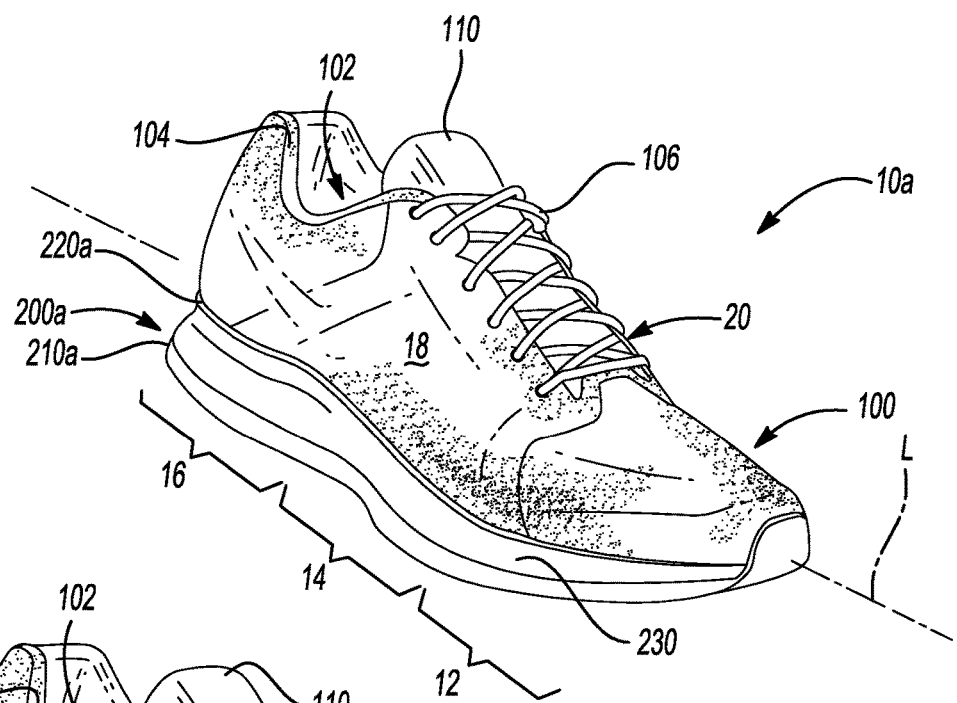
*Fig-9*
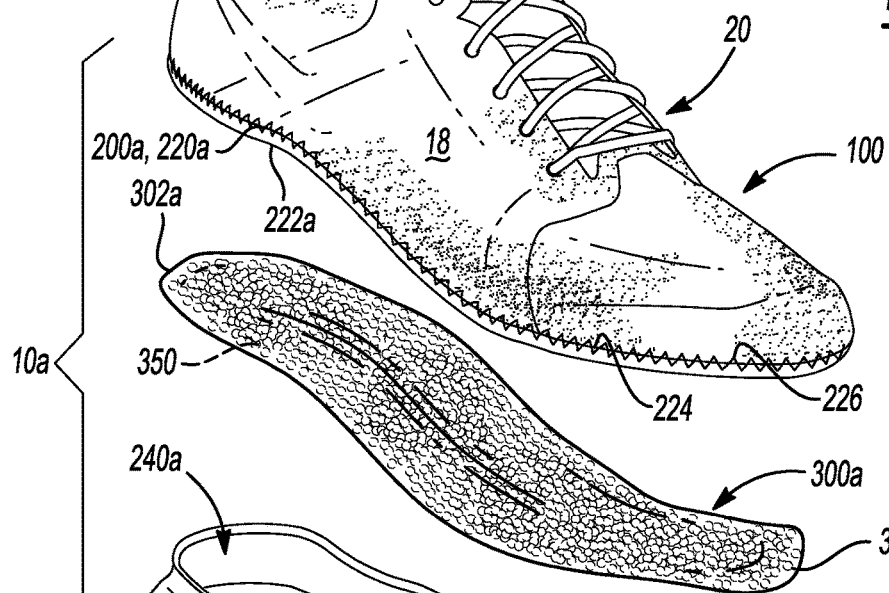
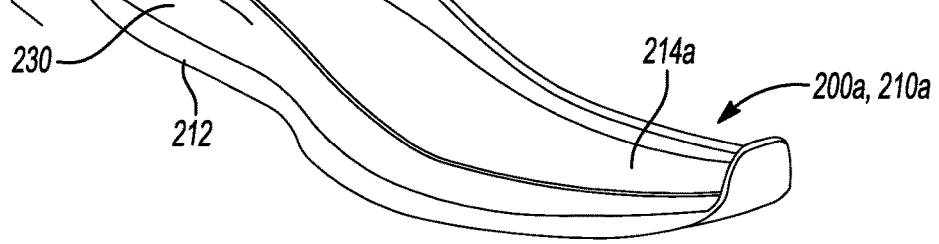
*Fig-10*

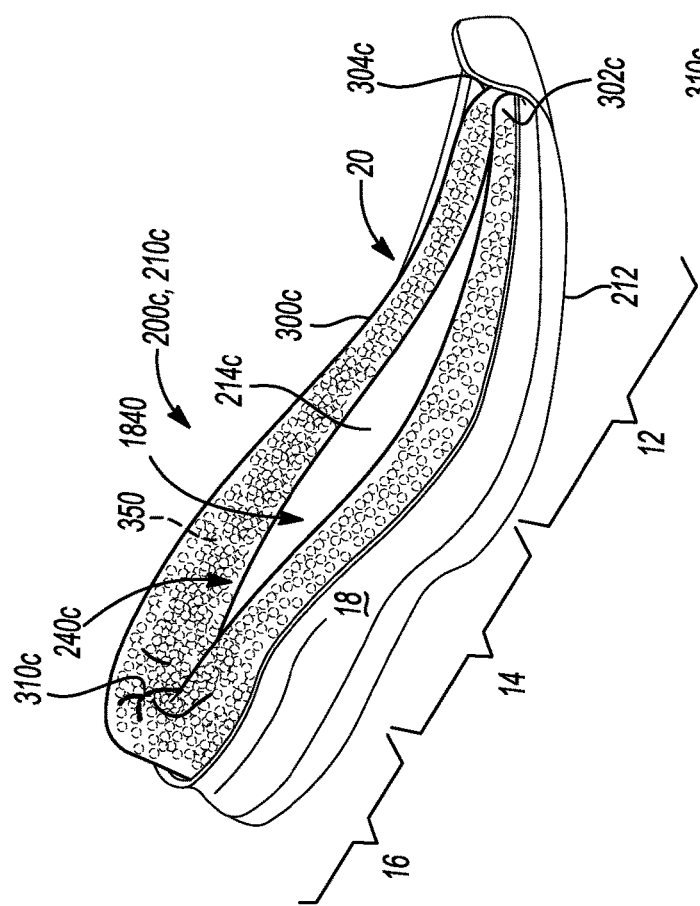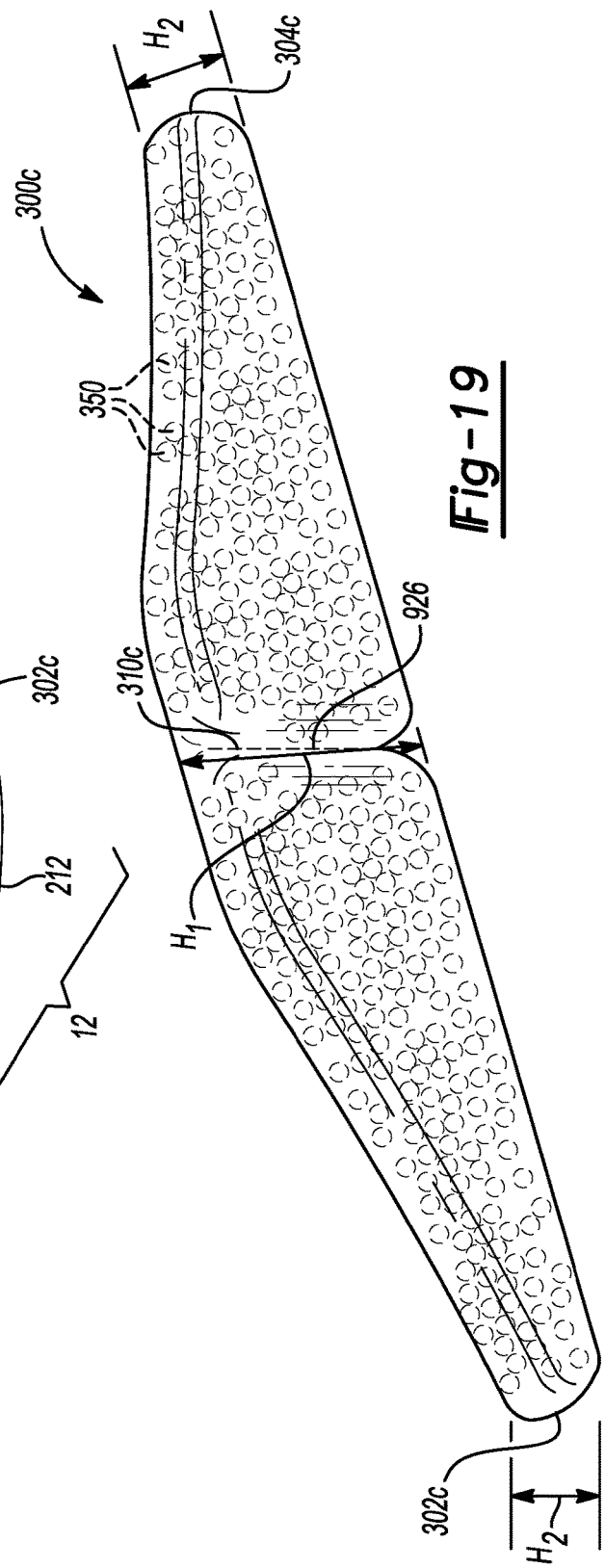

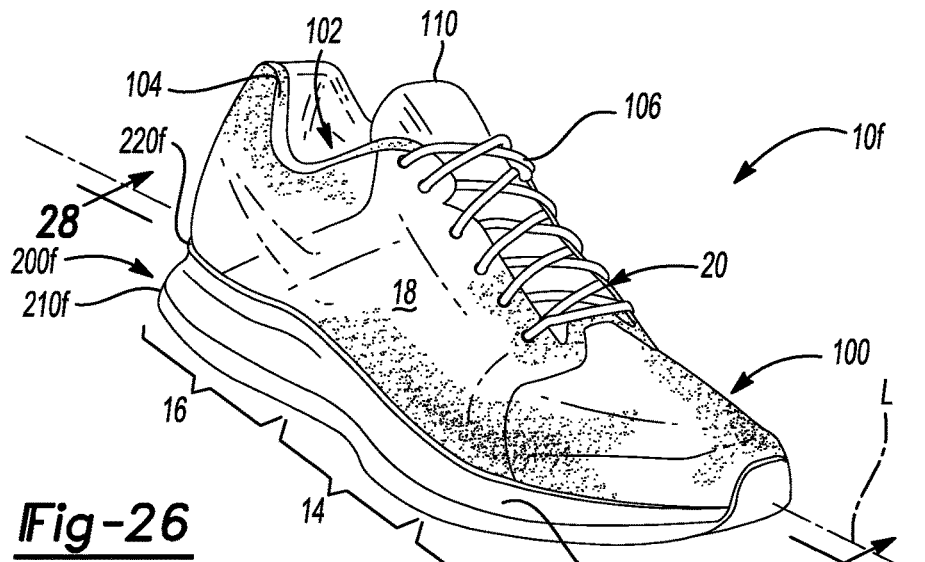
Fig-26
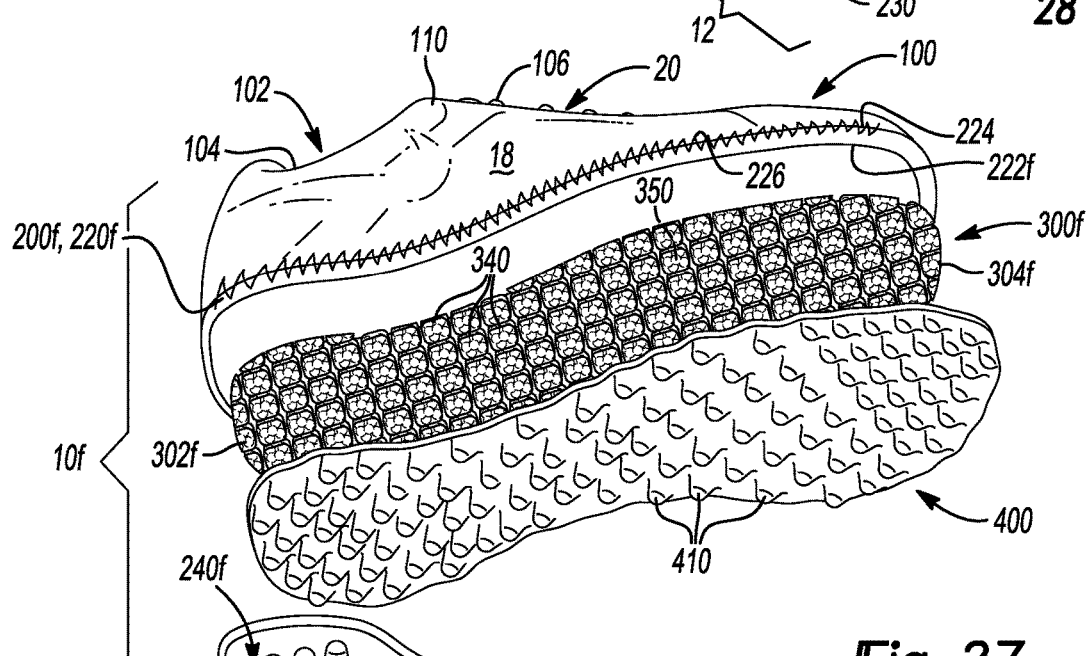
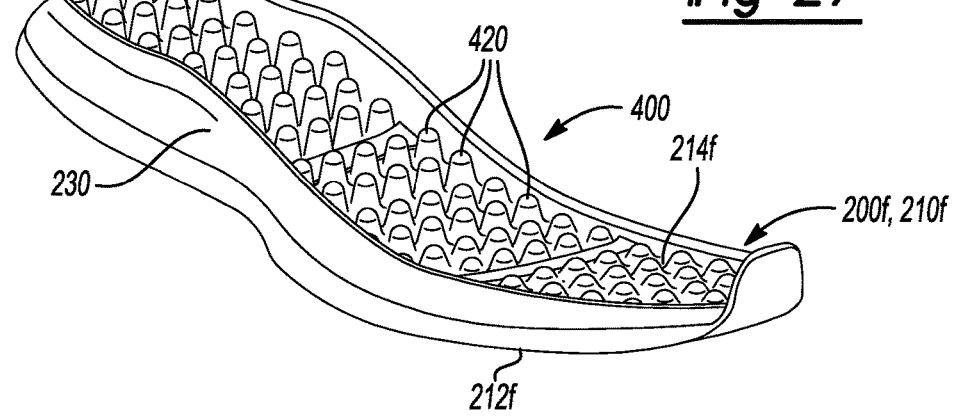
Fig-27

# PARTICULATE FOAM WITH FLEXIBLE CASING

CROSS REFERENCE TO RELATED APPLICATIONS

This application is a 371 National Stage entry based on International Application No. PCT/US2016/053256, filed Sep. 23, 2016, which claims priority to U.S. Provisional Application Ser. No. 62/222,882, filed Sep. 24, 2015, and to U.S. Provisional Application Ser. No. 62/222,873, filed Sep. 24, 2015, and to U.S. Provisional Application Ser. No. 62/222,851, filed Sep. 24, 2015, and to U.S. Provisional Application Ser. No. 62/222,842, filed Sep. 24, 2015, and to U.S. Provisional Application Ser. No. 62/222,832, filed Sep. 24, 2015, and to U.S. Provisional Application Ser. No. 62/222,816, filed Sep. 24, 2015, the disclosures of which are hereby incorporated by reference in their entirety.

FIELD

The present disclosure relates generally to articles of footwear having particulate foam contained within a flexible casing.

BACKGROUND

This section provides background information related to the present disclosure which is not necessarily prior art.

Articles of footwear conventionally include an upper and a sole structure. The upper may be formed from any suitable material(s) to receive, secure and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side that may be contoured to conform to a profile of the bottom surface of the foot. Sole structures may also include a comfort-enhancing insole or a sockliner located within a void proximate to the bottom portion of the upper.

Midsoles using polymer foam materials are generally configured as a single slab that compresses resiliently under applied loads, such as during walking or running movements. Generally, single-slab polymer foams are designed with an emphasis on balancing cushioning characteristics that relate to softness and responsiveness as the slab compresses under gradient loads. Polymer foams providing cushioning that is too soft will decrease the compressibility and the ability of the midsole to attenuate ground-reaction forces after repeated compressions. Conversely, polymer foams that are too hard and, thus, very responsive, sacrifice softness, thereby resulting in a loss in comfort. While different regions of a slab of polymer foam may vary in density, hardness, energy return, and material selection to balance the softness and responsiveness of the slab as a whole, creating a single slab of polymer foam that loads in a gradient manner from soft to responsive is difficult to achieve.

DRAWINGS

The drawings described herein are for illustrative purposes only of selected configurations and are not intended to limit the scope of the present disclosure.

FIG. 6 is a cross-sectional view taken along line 6-6 of FIG. 5 showing stitching to secure the fold at the predetermined location of the casing;

FIG. 7 is a cross-sectional view taken along line 7-7 of FIG. 5 showing particulate matter residing within an interior wall of the casing;

FIG. 8 is an alternate cross-sectional view taken along line 7-7 of FIG. 5 showing particulate matter residing in internal segments of the casing that are defined by an interior wall and dividers of the casing;

FIG. 9 is a top perspective view of an article of footwear in accordance with principles of the present disclosure;

FIG. 10 is an exploded view of the article of footwear of FIG. 9 showing a casing containing particulate matter received within a cavity bounded by a wall of an outsole and between a bottom surface of a midsole and an inner surface of the outsole;

FIG. 18 is a top perspective view of an outsole of the article of footwear of FIG. 16 showing a casing containing particulate matter and residing within a cavity bounded by a wall of the outsole and an inner surface of the outsole;

FIG. 19 is a perspective view of a casing of the article of footwear of FIG. 16 showing a stitched fold line located at a midpoint of the casing;

FIG. 26 is a top perspective view of an article of footwear in accordance with principles of the present disclosure;

Figure 28:
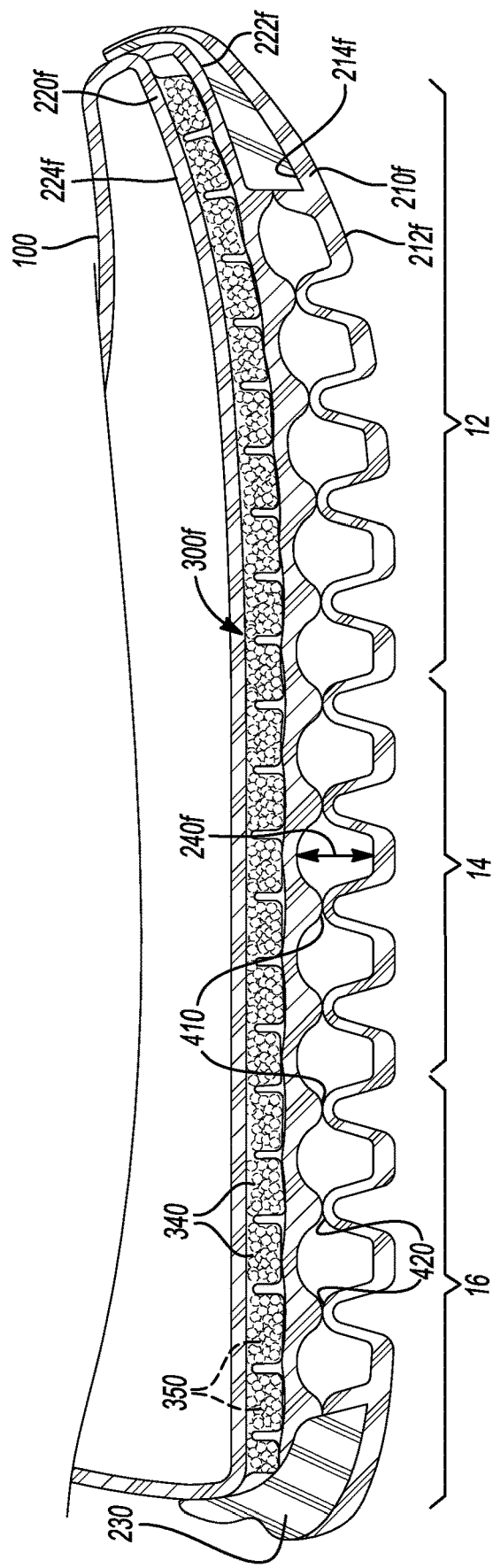

FIG. 27 is an exploded view of the article of footwear of FIG. 26 showing a tufted casing containing particulate matter and a cushioning layer disposed between a midsole and an outsole of the article of footwear; and FIG. 28 is a cross-sectional view taken along line 28-28 of FIG. 26 showing a tufted casing containing particulate matter and a cushioning layer disposed between a midsole and an outsole of the article of footwear.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure includes an article of footwear having an upper, a midsole, and an outsole. The midsole is attached to the upper and has a footbed and a bottom surface. The bottom surface and the footbed are disposed on opposite sides of the midsole. The outsole has a ground-engaging surface, an inner surface, and a wall extending from the ground-engaging surface and surrounding the outsole. The inner surface and the ground-engaging surface are disposed on opposite sides of the outsole. The article of footwear also includes a casing containing particulate matter. The casing has a length that is greater than a length of the outsole. The casing includes a first fold at a predetermined location along its length and is received within a cavity bounded by the wall of the outsole between the bottom surface and the inner surface.

In some implementations, the casing includes a first end and a second end. When the casing is folded at the predetermined location, the first end may be disposed proximate to the second end within the outsole. In some scenarios, the predetermined location is at or proximate to a midpoint at the casing, while in other scenarios, the predetermined location is disposed between the midpoint of the casing and an end of the casing.

The casing may be formed from a flexible material. Additionally or alternatively, the casing may be formed from a mesh material. Optionally, the casing is further formed from a nylon material. In some examples, the casing includes stitching to define the predetermined location.

In one configuration, walls of the casing are secured together to define at least two pockets each containing a quantity of the particulate matter. The at least two pockets may include approximately the same quantity of the particulate matter or different quantities of the particulate matter. The particulate matter may include foam beads having approximately the same size and shape or at least one of a different size and shape. The foam beads may include a substantially spherical shape.

In some examples, a second fold is located along a length of the casing between the predetermined location and a first end of the casing. Additionally, a third fold may be located along a length of the casing between the predetermined location and a second end of the casing disposed on an opposite end of the casing than the first end.

Another aspect of the disclosure includes an article of footwear having an upper, a midsole attached to the upper, and an outsole having a ground-engaging surface. The midsole has a footbed and a bottom surface disposed on an opposite side of the midsole than the footbed. The outsole also has an inner surface disposed on an opposite side of the outsole than the ground-engaging surface. A wall extends from the ground-engaging surface and surrounds the outsole. The article of footwear also includes a casing containing particulate matter. The casing has a length that is greater than a length of the outsole and at least one fold at a predetermined location along its length. The casing is received within a cavity bounded by the wall of the outsole and between the bottom surface and the inner surface.

In some examples, the casing includes a first end and a second end that may be disposed proximate to each other within the outsole when the casing is folded at the predetermined location. In some scenarios, the predetermined location is at or proximate to a midpoint of the casing, while in other scenarios, the predetermined location is disposed between the midpoint of the casing and an end of the casing.

The casing may be formed from a flexible material. Additionally or alternatively, the casing may be formed from a mesh material. Optionally, the casing is further formed from a nylon material. In some examples, the casing includes stitching to define the predetermined location. Walls of the casing may be secured together to define the predetermined location.

In some implementations, walls of the casing are secured together to define at least two pockets each containing a quantity of the particulate matter. The at least two pockets may include approximately the same quantity of the particulate matter or different quantities of the particulate matter. The particulate matter may include foam beads having approximately the same size and shape or at least one of a different size and shape. The foam beads may include a substantially spherical shape.

In yet another aspect of the disclosure, an article of footwear having an upper, a midsole, and an outsole is provided. The midsole is attached to the upper and has a footbed and a bottom surface. The bottom surface and the footbed are disposed on opposite sides of the midsole. The outsole has a ground-engaging surface, an inner surface, and a wall extending from the ground-engaging surface and surrounding the outsole. The inner surface and the ground-engaging surface are disposed on opposite sides of the outsole. The article of footwear also includes casing that contains particulate matter and has a length that is greater than a length of the outsole. The casing is folded on itself and is received within a cavity bounded by the wall of the outsole and between the bottom surface and the inner surface.

In some implementations, the casing is folded on itself at or proximate to a midpoint of the casing. Conversely, in other implementations, the casing is folded on itself between a midpoint of the casing and an end of the casing. In some examples, when the casing is folded on itself, a first end of the casing is disposed proximate to a second end of the casing within the outsole.

The casing may be formed from a flexible material. Additionally or alternatively, the casing may be formed from a mesh material. Optionally, the casing is further formed from a nylon material. In some examples, a predetermined location of the casing defines a fold and the casing may include stitching to define the predetermined location. Walls of the casing may be secured together to define the predetermined location.

Optionally, walls of the casing are secured together to define at least two pockets each containing a quantity of the particulate matter. The at least two pockets may include approximately the same quantity of the particulate matter or different quantities of the particulate matter. The particulate matter may include foam beads having approximately the same size and shape or at least one of a different size and shape. The foam beads may include a substantially spherical shape.

Another aspect of the present disclosure provides an article of footwear having an upper, a midsole attached to the upper, and an outsole having a ground-engaging surface. The midsole has a footbed and a bottom surface disposed on an opposite side of the midsole than the footbed. The outsole also has an inner surface disposed on an opposite side of the outsole than the ground-engaging surface. A wall extends from the ground-engaging surface and surrounds the outsole. The article of footwear also includes a casing that contains particulate matter and has a length extending between a first end and a second end. The first end is disposed proximate to the second end when the casing is received within a cavity bounded by the wall of the outsole and between the bottom surface and the inner surface.

The casing may be folded on itself at or proximate to a midpoint of the casing. Optionally, the casing is folded on itself between the midpoint of the casing and the first end of the casing. The casing may be formed from a flexible material. Additionally or alternatively, the casing may be formed from a mesh material. Optionally, the casing is further formed from a nylon material. In some examples, a predetermined location of the casing defines a fold and the casing may include stitching to define the predetermined location. Walls of the casing may be secured together to define the predetermined location.

In some implementations, walls of the casing are secured together to define at least two pockets each containing a quantity of the particulate matter. The at least two pockets may include approximately the same quantity of the particulate matter or different quantities of the particulate matter. The particulate matter may include foam beads having approximately the same size and shape or at least one of a different size and shape. The foam beads may include a substantially spherical shape.

Another aspect of the disclosure provides a method of making an article of footwear. The method includes providing a cavity between a footbed and an outsole, and providing a casing containing particulate matter. The method also includes folding the casing at a predetermined location along a length of the casing, and inserting the folded casing into the cavity.

In some implementations, providing the casing includes providing a casing having a length that is greater than a length of the outsole. In some examples, folding the casing at the predetermined location includes folding the casing at approximately a midpoint of the casing. In other examples, folding the casing at the predetermined location includes folding the casing at a location disposed between a midpoint of the casing and an end of the casing.

In some scenarios, the method includes inserting the folded casing into the cavity by positioning a first end of the casing proximate to a second end of the casing. The method may also include forming the casing from a flexible material. Additionally or alternatively, the method may also include forming the casing from a mesh material. In some examples, the method includes forming the casing from a nylon material. In some examples, the method includes providing the casing with stitching to define the predetermined location. The method may also include securing walls of the casing together to define the predetermined location.

Optionally, the method also includes securing walls of the casing together to define at least two pockets each containing a quantity of particulate matter. For example, the method may include defining at least two pockets containing approximately the same quantity of particulate matter or containing different quantities of particulate matter. In some examples, providing a casing containing particulate matter includes providing a casing containing a quantity of foam beads. The foam beads may have a substantially spherical shape. The foam beads may have approximately the same size and shape or at least one of a different size and shape.

Referring to FIGS. 1-8, in some implementations, an article of footwear 10 includes an upper 100 and a sole structure 200 attached to the upper 100. The article of footwear 10 may be divided into one or more portions. The portions may include a forefoot portion 12, a mid-foot portion 14 and a heel portion 16. The forefoot portion 12 may correspond with toes and joints connecting metatarsal bones with phalanx bones of a foot. The mid-foot portion 14 may correspond with an arch area of the foot, and the heel portion 16 may correspond with rear portions of the foot, including a calcaneus bone. The footwear 10 may include lateral and medial sides 18, 20, respectively, corresponding with opposite sides of the footwear 10 and extending through the portions 12, 14, 16.

The upper 100 includes interior surfaces that define an interior void 102 configured to receive and secure a foot for support on the sole structure 200. Ankle opening 104 in the heel portion 16 may provide access to the interior void 102. For example, the ankle opening 104 may receive a foot to secure the foot within the void 102 and facilitate entry and removal of the foot from and to the interior void 102. In some examples, one or more fasteners 106 extend along the upper 100 to adjust a fit of the interior void 102 around the foot and accommodate entry and removal therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort.

In some implementations, the sole structure 200 includes an outsole 210 and a midsole 220 arranged in a layered configuration. The sole structure 200 (e.g., the outsole 210 and the midsole 220) defines a longitudinal axis L. For example, the outsole 210 engages with a ground surface during use of the article of footwear 10 and the midsole 220 is disposed between the upper 100 and the outsole 210. In some examples, the sole structure 200 may also incorporate additional layers such as an insole or sockliner that may reside within the interior void 102 of the upper 100 to receive a plantar surface of the foot to enhance the comfort of the footwear 10. In some examples, a sidewall 230 (e.g., wall 230) separates the outsole 210 and the midsole 220 to define a cavity 240 therebetween. In some configurations, a casing 300 that contains particulate matter 350 resides in the cavity 240 to provide cushioning for the foot during use of the footwear 10. The casing 300 may define a length that extends between a first end 302 and a second end 304. The length of the casing 300 may be greater than a length of the outsole 210 extending along the longitudinal axis L. In some examples, the casing 300 is formed from a flexible material. The casing 300 may optionally be formed from a mesh material. Additionally or alternatively, the casing 300 may be formed from a nylon material.

The casing 300 and the particulate matter 350 residing within the cavity 240 may cooperate to enhance the functionality and cushioning characteristics that a conventional midsole provides. For example, the particulate matter 350 contained within the casing 300 may include foam beads having a substantially spherical shape. In some examples, the particulate matter 350 includes foam beads that have approximately the same size and shape. In other examples, the particulate matter 350 includes foam beads having at least one of a different size and shape. Regardless of the particular size and shape of the particulate matter 350, the particulate matter 350 cooperates with the outsole 210 and the midsole 220 to provide the article of footwear 10 with a cushioned and responsive performance.

Figure 1:
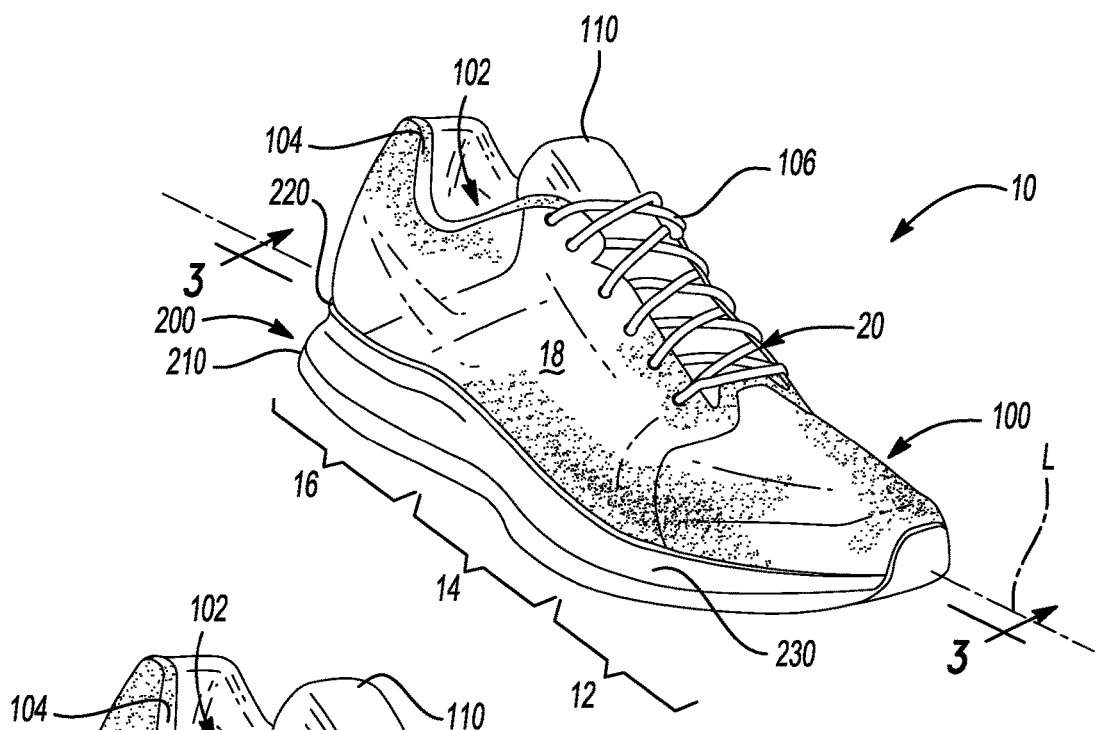
FIG. 1 is a top perspective view of an article of footwear in accordance with principles of the present disclosure.

In some examples, the outsole 210 includes a ground-engaging surface 212 and an opposite inner surface 214. The outsole 210 may attach to the upper 100. In some examples, the sidewall 230 extends from the perimeter of the outsole 210 and attaches to the midsole 220 or the upper 100. The example of FIG. 1 shows the outsole 210 attaching to the upper 100 proximate to a tip of the forefoot portion 12. The outsole 210 generally provides abrasion-resistance and traction with the ground surface and may be formed from one or more materials that impart durability and wear-resistance, as well as enhance traction with the ground surface. For example, rubber may form at least a portion of the outsole 210.

The midsole 220 may include a bottom surface 222 and a footbed 224 disposed on an opposite side of the midsole 220 than the bottom surface 222. Stitching 226 or adhesives may secure the midsole 220 to the upper 100. The footbed 224 may be contoured to conform to a profile of the bottom surface (e.g., plantar) of the foot. In some examples, an insole or sockliner may be disposed on the footbed 224 under the foot within at least a portion of the interior void 102 of the upper 100. The bottom surface 222 may oppose the inner surface 214 of the outsole 210 to define the cavity 240 therebetween.

The midsole 220 may be formed from a flexible material to provide sufficient flexibility to conform to the particulate matter 350 disposed within the casing 300 and residing in the cavity 240. In so doing, the flexible midsole 220 may correspond to a flexible strobel that allows the particulate matter 350 residing in the cavity 240 to interact with the profile of the bottom surface of the foot during gradient loading of the sole structure 200. In some examples, the sidewall 230 may define a perimeter of the cavity 240 as well as a depth of the cavity 240 based on a length of separation between the bottom surface 222 and the inner surface 214. One or more polymer foam materials may form the sidewall 230 to provide resilient compressibility under an applied load to attenuate ground-reaction forces. In some examples, the sidewall 230 is integrally formed with the outsole 210 and extends substantially perpendicular to the longitudinal axis from the inner surface 214 toward the bottom surface 222 of the midsole 220.

Figure 2:
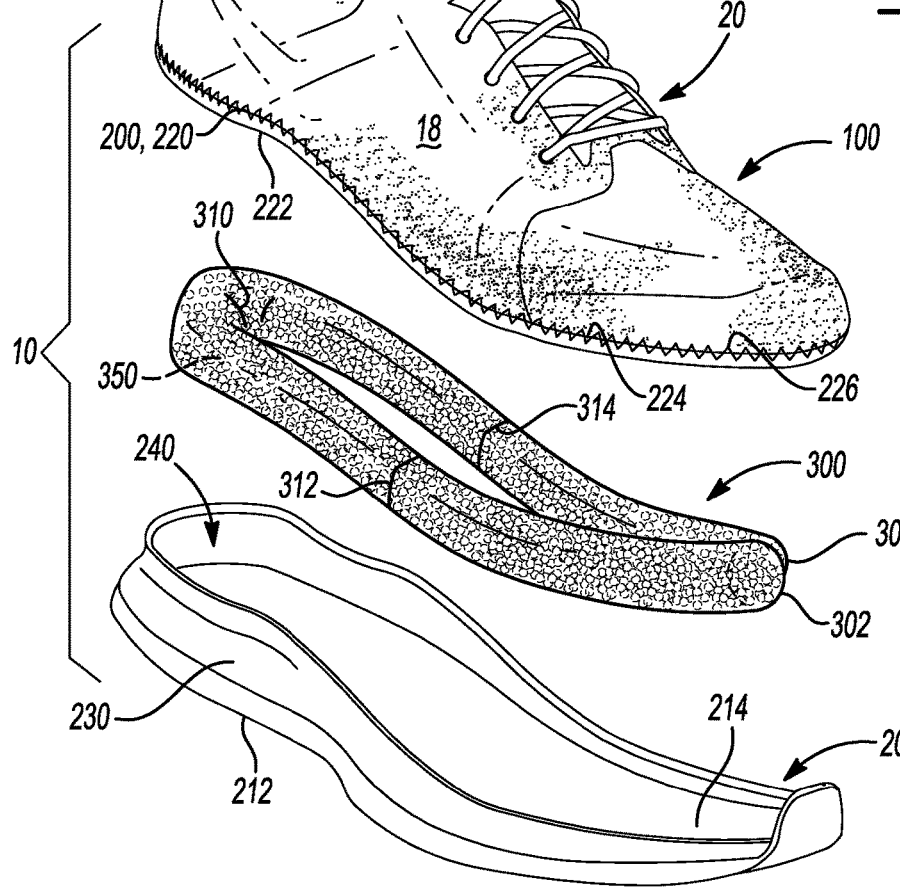
FIG. 2 is an exploded view of the article of footwear of FIG. 1 showing a casing containing particulate matter received within a cavity bounded by a wall of an outsole and between a bottom surface of a midsole and an inner surface of the outsole.
Figure 17:
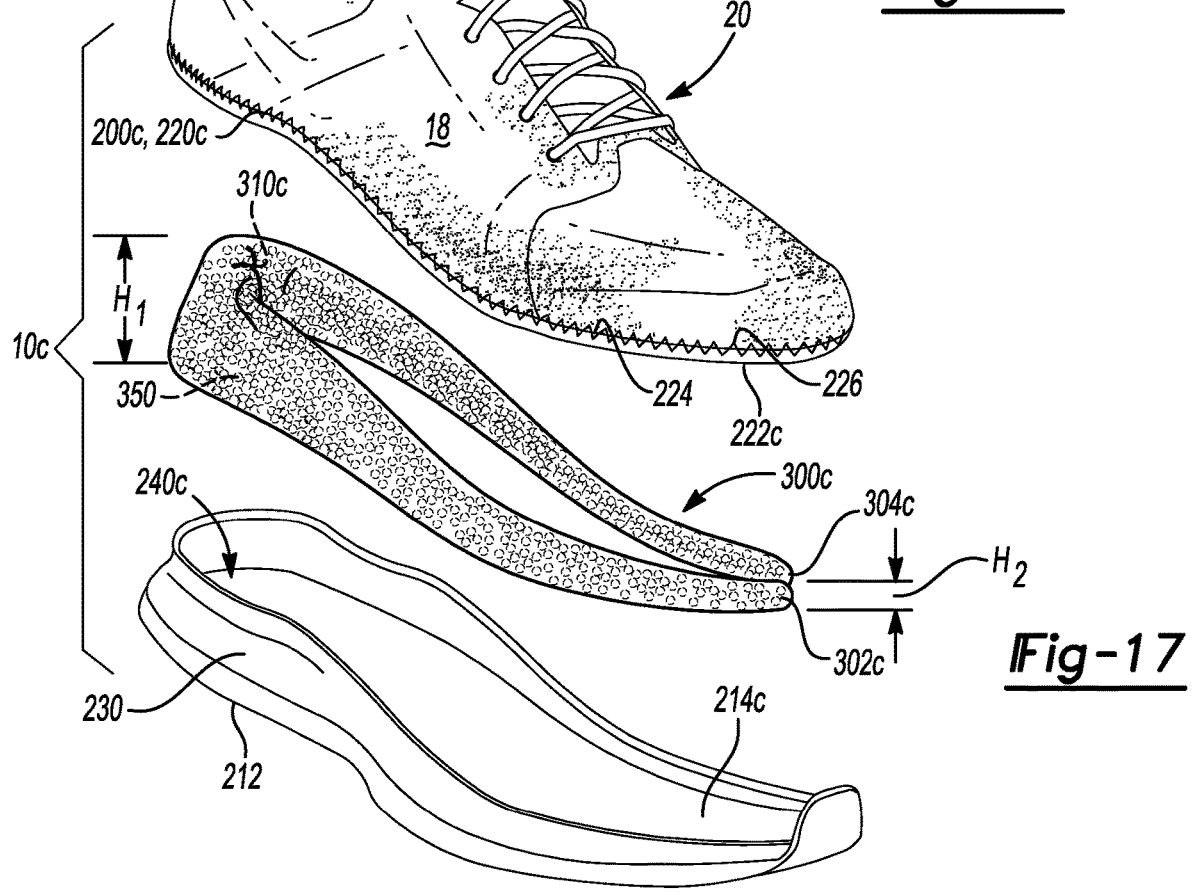
FIG. 17 is an exploded view of the article of footwear of FIG. 16 showing a casing containing particulate matter received within a cavity bounded by a wall of an outsole and between a bottom surface of a midsole and an inner surface of the outsole.

FIG. 2 provides an exploded view of the article of footwear 10 showing the casing 300 containing the particulate matter 350 received within the cavity 240 bounded by the sidewall 230 of the outsole 210 and between the bottom surface 222 of the midsole 220 and the inner surface 214 of the outsole 210. In this example, the casing 300 includes a first fold 310 at a predetermined location along its length. Specifically, the first fold 310 at the predetermined location corresponds to a midpoint of the casing 300. The example of FIG. 2 shows the first end 302 of the casing 300 being disposed proximate to the second end 304 of the casing 300 within the cavity 240 near or on the inner surface 214 of the outsole 210 when the casing 300 is folded at the predetermined location corresponding to the midpoint of the casing 300. In some examples, the casing 300 is tube-shaped and has a uniform cross-section when filled with the particulate matter 350. In other examples, the casing 300 may taper from the midpoint towards each of the first and second ends 302, 304, respectively (FIG. 17).

In some configurations, the casing 300 may include a second fold 312 located along its length between the midpoint and the first end 302. The second fold 312 may permit a quantity of particulate matter 350 contained between the second fold 312 and the first end 302 to be separated from a quantity of particulate matter 350 contained between the second fold 312 and the midpoint 310. Thus, the second fold 312 may restrict quantities of particulate matter 350 residing on each side of the second fold 312 from migrating to the other side of the second fold 312. The second fold 312 may be defined by stitching or fastening one or more portions of the casing 300 wall together to define the second fold line 312. Additionally or alternatively, the casing 300 may include a third fold 314 located along its length between the midpoint 310 and the second end 304. The third fold 314 may permit a quantity of particulate matter 350 contained between the third fold 314 and the second end 304 to be separated from a quantity of particulate matter 350 contained between the third fold 314 and the midpoint 310. Thus, the third fold 314 may restrict quantities of particulate matter 350 residing on each side of the third fold 314 from migrating to the other side of the third fold 314. The second fold 312 and/or the third fold 314 may be defined by stitching or securing one or more portions of the casing 300 wall together to define the corresponding folds 312, 314. While the folds 312, 314 may be disposed at a midpoint between the first fold and the respective first and second ends 302, 304, the folds 312, 314 could alternatively be disposed at any point long a length of the casing 300 between the first fold and the respective first and second ends 302, 304.

Figure 3:
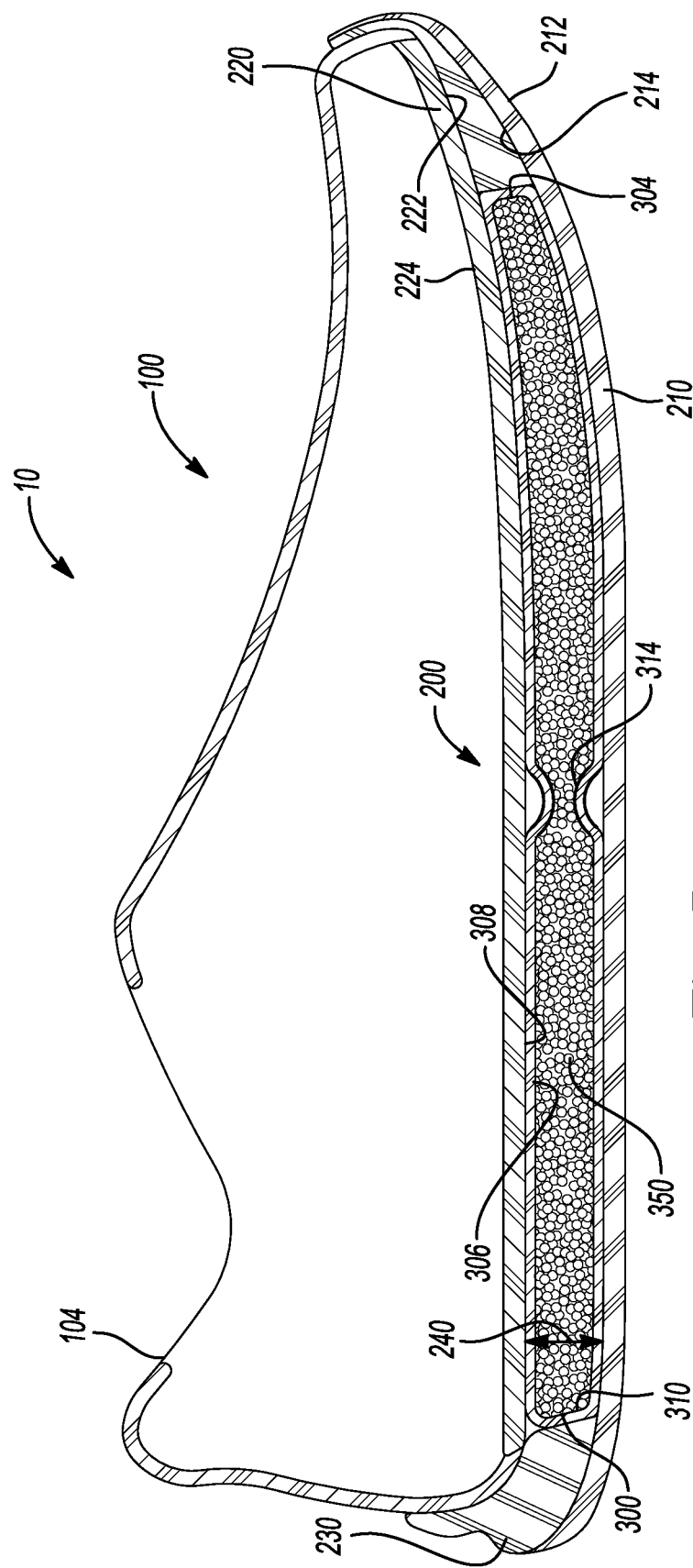
FIG. 3 is a cross-sectional view taken along line 3-3 of FIG. 1 showing a casing containing particulate matter received within a cavity between a bottom surface of a midsole and an inner surface of an outsole.

Referring to FIG. 3, a cross-sectional view taken along line 3-3 of FIG. 1 shows the casing 300 containing particulate matter 350 received within the cavity 240 bounded by the sidewall 230 and between the bottom surface 222 and the inner surface 214. Specifically, FIG. 3 shows a view of the casing from the first fold 310 at the midpoint to the second end 304. The casing 300 includes the first fold 310 at the midpoint resulting in the first end 302 (not shown) being disposed proximate to the second end 304 of the casing 300. Optionally, the casing 300 may include the second fold 312 (not shown) or the third fold 314 located between the midpoint 310 (e.g., first fold) and corresponding ends 302, 304 of the casing 300. The casing 300 includes an exterior wall 308 that contacts the bottom surface 222 of the midsole 220 and the inner surface 214 of the outsole 210 when the casing 300 resides in the cavity 240.

The casing 300 also includes an interior wall 306 that surrounds and encloses the particulate matter 350 residing therein. The particulate matter 350 residing within the casing 300 may compress at one or more of the portions 12, 14, 16 of the sole structure 200 to attenuate ground-reaction forces when gradient loads are applied thereto. In some examples, the casing 300 is formed from a flexible material. The casing 300 may optionally be formed from a mesh material. Additionally or alternatively, the casing 300 may be formed from a nylon material. Thus, the casing 300 may be formed from a flexible material, the mesh material, and/or the nylon material. Optionally, the casing 300 may be formed from any suitable material that allows the received particulate matter 350 to conform to the sole structure 200, such as surface profiles of the inner and bottom surfaces 214, 222, respectively, as well as the contour of the sidewall 230.

Figure 4:
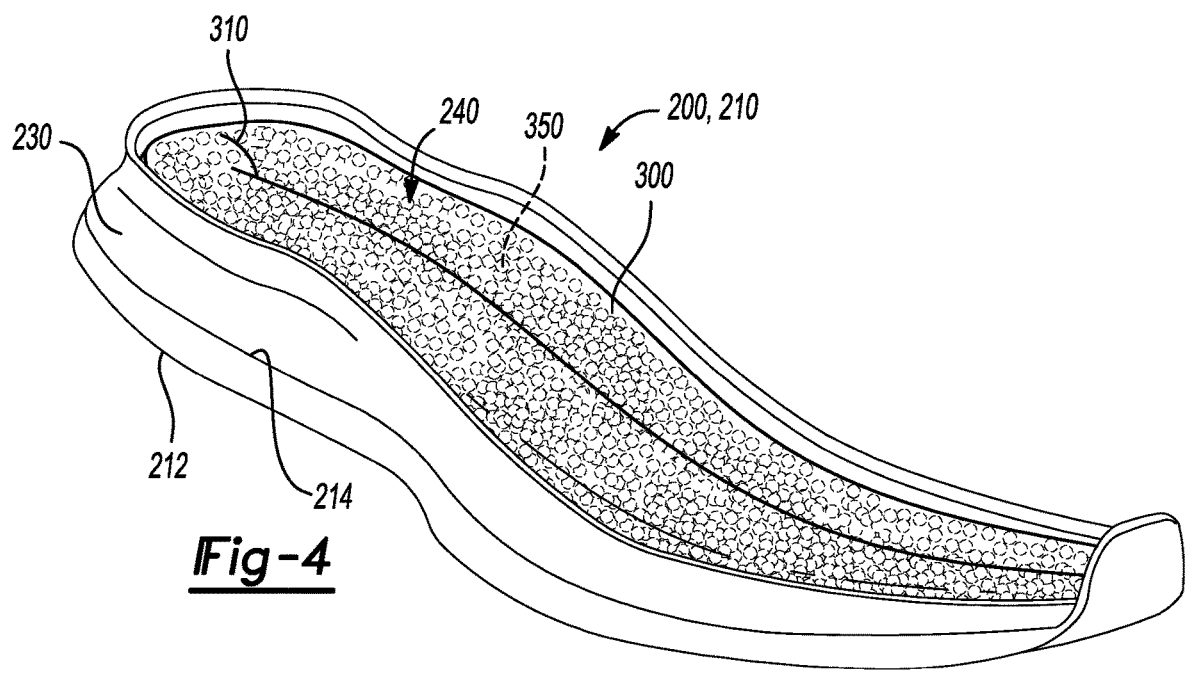
FIG. 4 is a top perspective view of an outsole of the article of footwear of FIG. 1 showing a casing containing particulate matter and residing within a cavity bounded by a wall of the outsole and an inner surface of the outsole.

FIG. 4 shows a top perspective view of the outsole 210 showing the casing 300 containing the particulate matter 350 and including the first fold 310 at its midpoint while disposed within the cavity 240. The casing 300 may be flexible to allow the casing to conform to the contour of the inner surface 214 and the contour of the sidewall 230 that bound the casing 300. The casing 300 may partially or entirely fill the cavity 240. In some examples, at least a portion of the casing 300 resides above the sidewall 230 to exceed the depth of the cavity 240. In these examples, when the outsole 210 is attached to the midsole 220 or the upper 100, the casing 300 containing the particulate matter 350 compresses between the inner surface 214 of the outsole 210 and the bottom surface 222 of the midsole 220.

Figure 5:
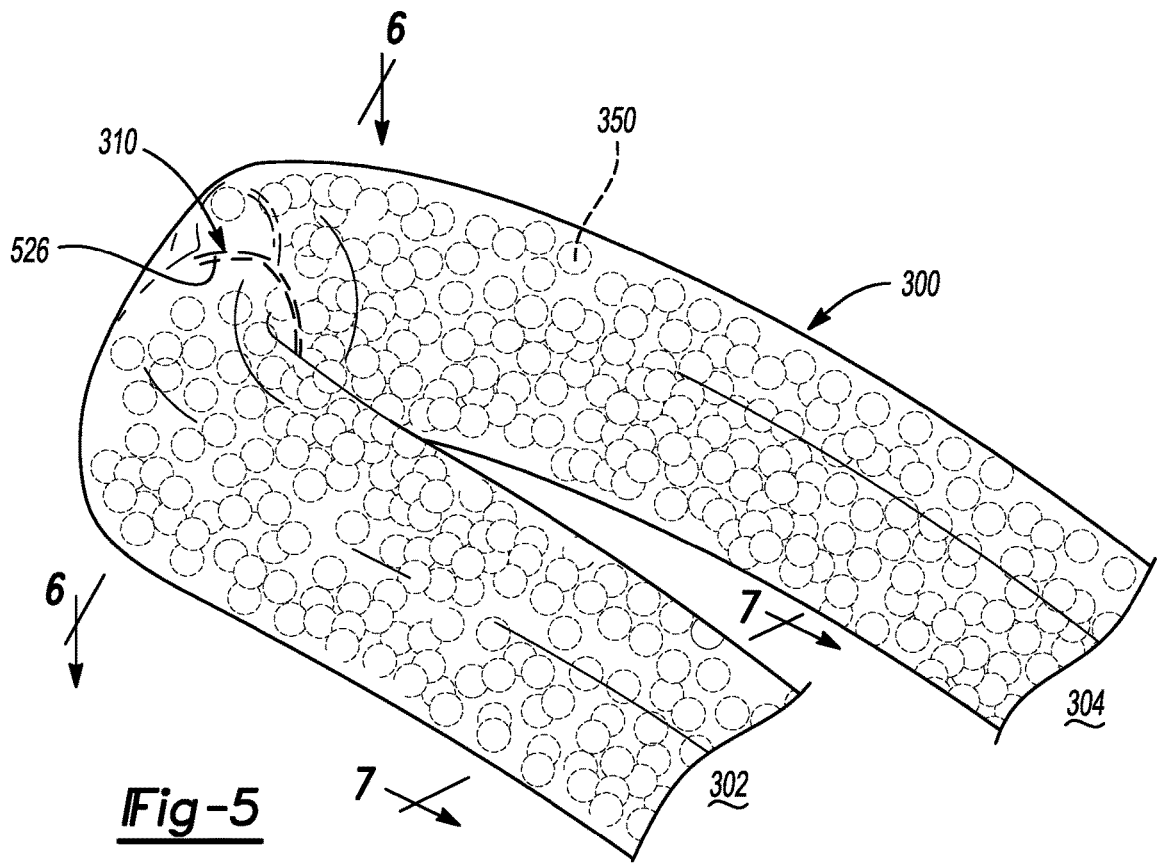
FIG. 5 is a partial perspective view of the casing of FIGS. 2-4 showing the casing having a fold at a predetermined location and containing the particulate matter.

FIG. 5 shows a partial perspective view of the casing 300 of FIGS. 2-4 containing the particulate matter 350 and including the first fold 310 at its midpoint. When the casing 300 is folded and disposed within the cavity 240, repeated compressions by the sole structure 200 may cause the first fold 310 to loosen, unravel, or otherwise partially unfold, in response to particulate matter 350 shifting within the casing 300. Under these scenarios, the particulate matter 350 may migrate from one side of the midpoint 310 to the other side of the midpoint 310, thereby resulting in a non-uniform distribution of particulate matter 350 residing in the casing 300 that causes some areas of the casing 300 to provide little to no cushioning. In some implementations, to prevent the first fold 310 from unfolding, the casing 300 includes stitching 526 to define the predetermined location (e.g., the midpoint) corresponding to the first fold 310. For example, FIG. 6 provides a cross-sectional view taken along line 6-6 of FIG. 5 showing one or more portions of the exterior wall 308 and/or the interior wall 306 of the casing 300 secured together by stitching 526 or other fastening techniques to define the predetermined location (e.g., the midpoint) and maintain the first fold 310. Securing the first fold 310 at the midpoint restricts the particulate matter 350 from freely moving throughout the casing 300 and, further, provides a bend point that allows for easy assembly of the casing 300 into the cavity 240.

In some implementations, the particulate matter 350 (e.g., foam beads) slightly over fills (e.g., stuffs) the casing 300 to permit the particulate matter 350 to occupy all voids enclosed by the interior wall 306, thereby expanding the casing 300 to provide a substantially uniform and smooth surface profile at the exterior wall 308. FIGS. 7 and 8 provide schematic cross-sectional views taken along line 7-7 of FIG. 5 showing examples of the particulate matter 350 substantially filling all voids enclosed by the interior wall 306.

Referring to FIG. 7, in some examples, the interior wall 306 of the casing 300 defines a single internal region 710 that receives and contains the particulate matter 350 (e.g., foam beads). Optionally, in other examples with reference to FIG. 8, the casing 300 includes one or more dividers 802, 804 that cooperate with the interior wall 306 to define two or more internal regions 810, 812, 814 each receiving and containing a corresponding quantity of particulate matter 350 (e.g., foam beads). In these examples, the dividers 802, 804 restrict unfettered movement of the particulate matter 350 during repeated compressions by constraining quantities of particulate matter 350 within corresponding internal regions 810, 812, 814, thereby maintaining a uniform distribution of the particulate matter 350 enclosed by the interior wall 306.

The dividers 802, 804 may be secured to each other and to the interior and/or exterior walls 306, 308, respectively, by stitching 826 or other suitable fastening techniques. While the example of FIG. 8 shows the casing 300 as including two dividers 802, 804 to define three internal regions 810, 812, 814, any configuration of one or more dividers may be used to define two or more internal regions. In some implementations, the casing 300 includes a combination of two or more internal regions 810, 812, 814 (FIG. 8) and a single internal region 710 along its length between the first and second ends 302, 304, respectively. For instance, segments of the casing 300 susceptible to compressing more frequently during gradient loading of the sole structure 200, such as the heel portion 16 or the forefoot portion 12, may have two or more internal regions to restrict movement of the particulate matter 350 within and relative to the casing 300. On the other hand, segments of the casing 300 that compress less frequently or are under low-compression, such as the mid-foot portion 14, may include a single internal region 710, as vast movement of the particulate matter 350 is less likely to occur. While the casing 300 restricts free movement of the particulate matter 350, some shifting of particulate matter 350 residing within the casing 300 may be desirable. For example, at segments proximate to the mid-foot portion 14 movement of the particulate matter 350 relative to and within the casing 300 provides gradient cushioning as the ground-engaging surface 212 of the outsole 210 rolls for engagement with the ground surface between the heel portion 16 and the forefoot portion 12.

Referring to FIGS. 9-12, in some implementations, an article of footwear 10a includes an upper 100 and a sole structure 200a attached to the upper 100. In view of the substantial similarity in structure and function of the components associated with the article of footwear 10 with respect to the article of footwear 10a, like reference numerals are used hereinafter and in the drawings to identify like components while like reference numerals containing letter extensions are used to identify those components that have been modified.

The sole structure 200a may include an outsole 210a and a midsole 220a arranged in the layered configuration. The outsole 210a includes an inner surface 214a disposed on an opposite side of the outsole 210a than the ground-engaging surface 212. The midsole 220a includes a bottom surface 222a disposed on an opposite side of the midsole 220a than the footbed 224. The sidewall 230 bounds a cavity 240a between the bottom surface 222a and the inner surface 214a. The sidewall 230 may separate the bottom surface 222a and the inner surface 214a to define a depth of the cavity 240a.

Figure 11:
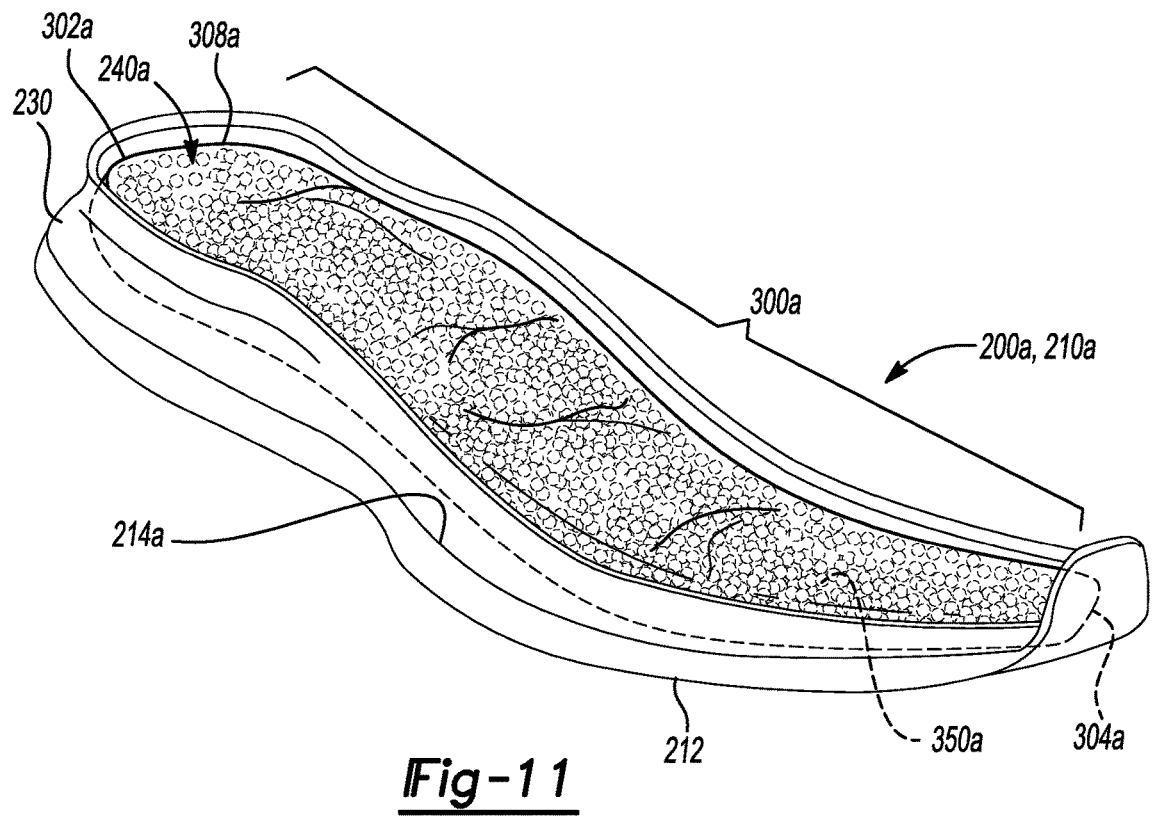
FIG. 11 is a top perspective view of an outsole of the article of footwear of FIG. 9 showing a casing containing particulate matter and residing within a cavity bounded by a wall of the outsole and an inner surface of the outsole.

In some configurations, a loaf-shaped casing 300a may contain particulate matter 350 and reside within the cavity 240a on the inner surface 214a of the outsole 210a. FIG. 10 provides an exploded view of the article of footwear 10a showing the loaf-shaped casing 300a having a length extending along the longitudinal axis L and between a first end 302a and a second end 304a. The casing 300a may have a size and shape substantially conforming to the outline of the midsole 220a and the outsole 210a. The midsole 220a may be formed from the flexible material forming the midsole 220 of FIGS. 1-8 to provide the midsole 220a with sufficient flexibility, thereby allowing the particulate matter 350 disposed within the loaf-shaped casing 300a and residing in the cavity 240a to interact with the profile of the bottom surface of the foot during gradient loading of the sole structure 200a. The casing 300a, when filled with the particulate matter 350, also includes a volume that at least partially fills the cavity 240a. FIG. 11 provides a top perspective view of the outsole 210a showing the casing 300a containing the particulate matter 350 and residing within the cavity 240a. In the example, the first end 302a is disposed proximate to the heel portion 16 and the second end 304a is disposed proximate to the forefoot portion 12 when the casing 300a lies overtop the inner surface 214a.

The casing 300a may be formed from a flexible material. For example, the casing 300a may be formed from a mesh material and/or the nylon material that form the tube-shaped casing 300 of FIGS. 1-8. Accordingly, the casing 300a and the particulate matter 350 may conform to the shape and size of the cavity 240a. For example, an interference fit may be provided between the casing 300a and the sidewall 230 when the casing 300a is installed in the cavity 240a. In some examples, the particulate matter 350 (e.g., foam beads) slightly over fills the casing 300a to permit the particulate matter 350 to occupy all voids within the casing 300a, thereby expanding the casing 300a to provide a substantially uniform and smooth surface profile at an exterior wall 308a of the casing 300a.

Figure 12:
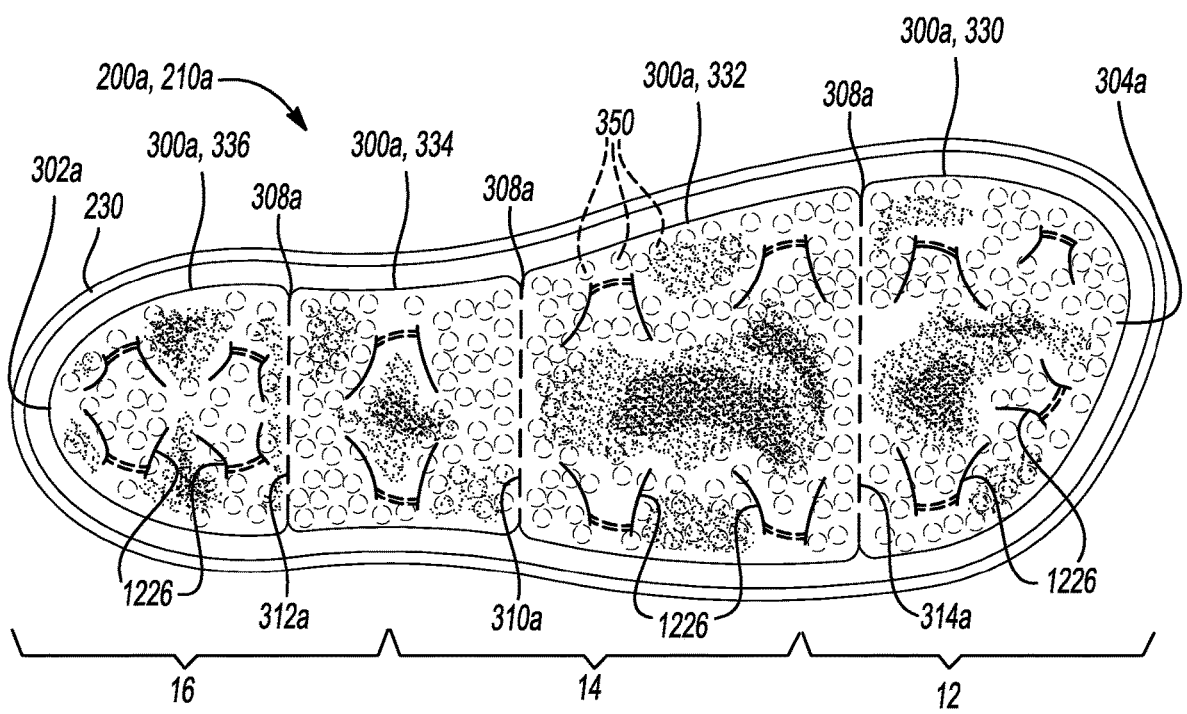
FIG. 12 is a top view of an outsole of the article of footwear of FIG. 9 showing a casing bounded by a wall of the outsole with walls of the casing secured to each other to define pockets each containing particulate matter.

In some implementations, the loaf-shaped casing 300a may define two or more pockets each containing a corresponding quantity of particulate matter 350. The one or more pockets may extend along the length of the casing 300a between the first end 302a and the second end 304a as well as between the lateral and medial sides 18, 20, respectively, of the sole structure 200a. FIG. 12 provides a schematic top view of the casing 300a defining pockets 330, 332, 334, 336 each containing a corresponding quantity of particulate matter 350. In some examples, portions of the exterior wall 308a and/or interior wall (not shown) of the casing 300a are secured together to define the pockets 330, 332, 334, 336. In some configurations, the casing 300a includes one or more fold lines 310a, 312a, 314a located along a length of the casing 300a and extending between the lateral and medial sides 18, 20, respectively. A first fold line 310a may be located at a predetermined location corresponding to a midpoint proximate to the mid-foot portion 12 of the sole structure 200a, a second fold line 312a may be located between the midpoint and the first end 302a of the casing 300a, and a third fold line 314a may be located between the midpoint and the second end 304a of the casing 300a.

The walls of the casing 300a may be secured at the fold lines 310a, 312a, 314a to form the pockets 330, 332, 334, 336. Accordingly, the pocket 330 corresponding to a toe area of the foot may be formed in the casing 300a to the right of the third fold line 314a relative to the view shown in FIG. 12, the pocket 332 corresponding to a metatarsal area of the foot may be formed in the casing 300a between the first fold line 310a and the third fold line 314a, the pocket 334 corresponding to an arch area of the foot may be formed between the first fold line 310a and the second fold line 312a, and the pocket 336 corresponding to a heel area of the foot may be formed to the left of the second fold line 312a relative to the view shown in FIG. 12. In some configurations, the casing 300a may form more or less pockets by adding or omitting fold lines. In some scenarios, the pockets are formed after the particulate matter 350 fills the casing 330a.

In some implementations, each of the two or more pockets 330, 332, 334, 336 include approximately the same quantity of particulate matter 350 (e.g., foam beads). In other implementations, at least one of the two or more pockets 330, 332, 334, 336 include different quantities of particulate matter 350. For instance, it may be desirable to include a greater quantity of particulate matter 350 in pockets 332, 336 to increase the level of soft-type cushioning at the metatarsal and heel areas, respectively. The two or more pockets 330, 332, 334, 336 may additionally restrict the corresponding quantities of particulate matter 350 from migrating to adjoining pockets. However, some movement of particulate matter 350 is permitted within the corresponding pockets 330, 332, 334, 336 to provide fluid cushioning during gradient loading of the sole structure 200a. In other words, the two or more pockets 330, 332, 334, 336 are effective to prevent the loss of cushioning in areas of the sole structure 200a caused by particulate matter 350 migration during repeated compressions of the sole structure 200a but permit movement of the particulate matter 350 within each pocket 330, 332, 334, 336.

In some configurations, referring to FIG. 12, central regions inside the perimeter of the casing 300a may be secured by stitching 1226 to form quilted or tufted regions. Generally, higher levels of cushioning are desirable toward the center of the sole structure 200a between the lateral and medial sides 18, 20, respectively, that supports a majority of the surface of the foot, and, thus, bares a majority of the load that the foot exerts. Additionally, forces applied by the foot during ground-reaction forces may cause particulate matter 350 to shift outward and away from the center of the casing 300a. By securing walls of the casing 300a via stitching 1226 to form the quilted or tufted regions proximate to the center of the casing 300a, higher concentrations of particulate matter 350 may reside toward the center of casing 300a and may be prevented from migrating or shifting outward during applied loads to the sole structure 200a.

Figure 13:
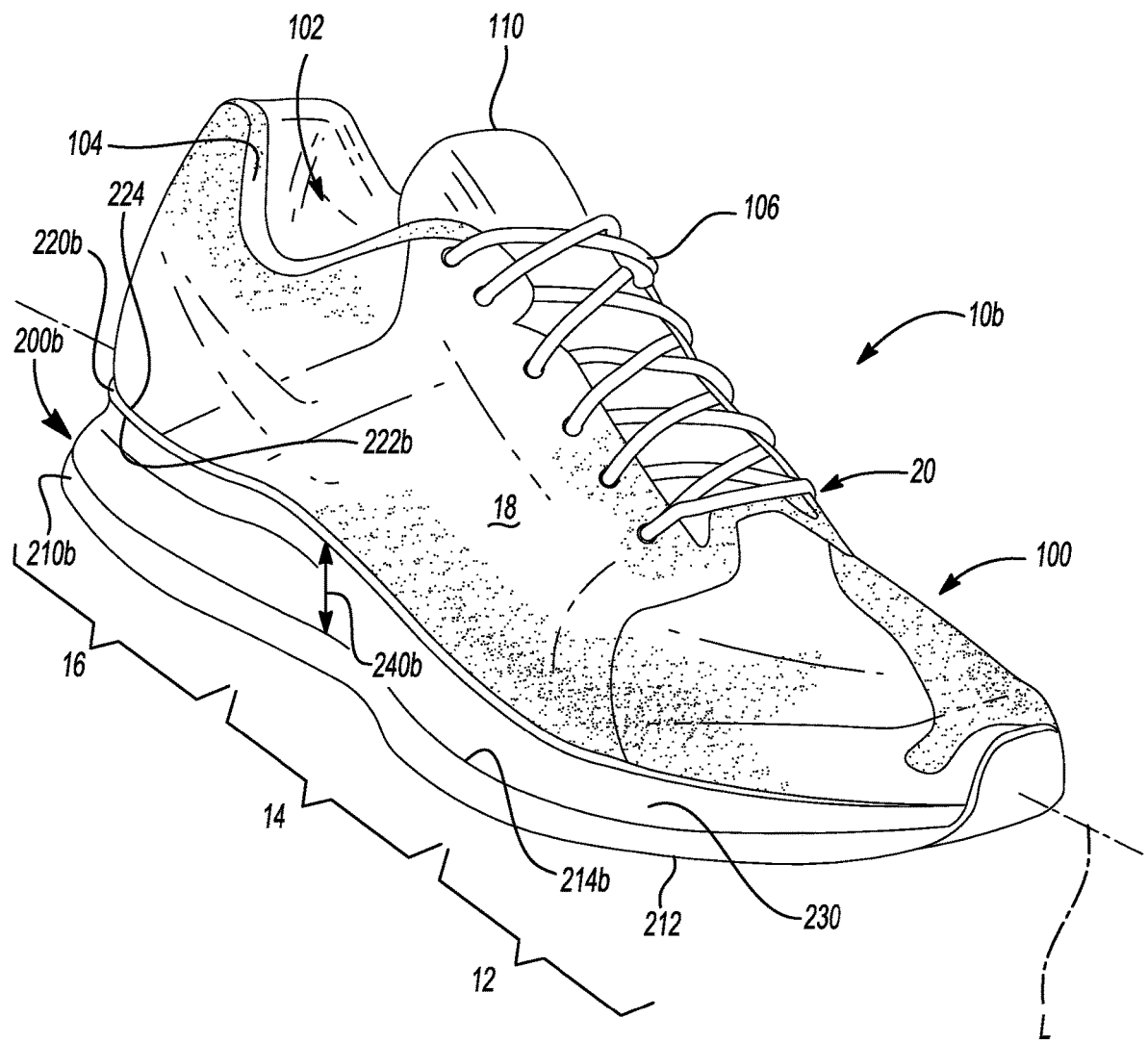
FIG. 13 is a top perspective view of an article of footwear in accordance with principles of the present disclosure.
Figure 14:
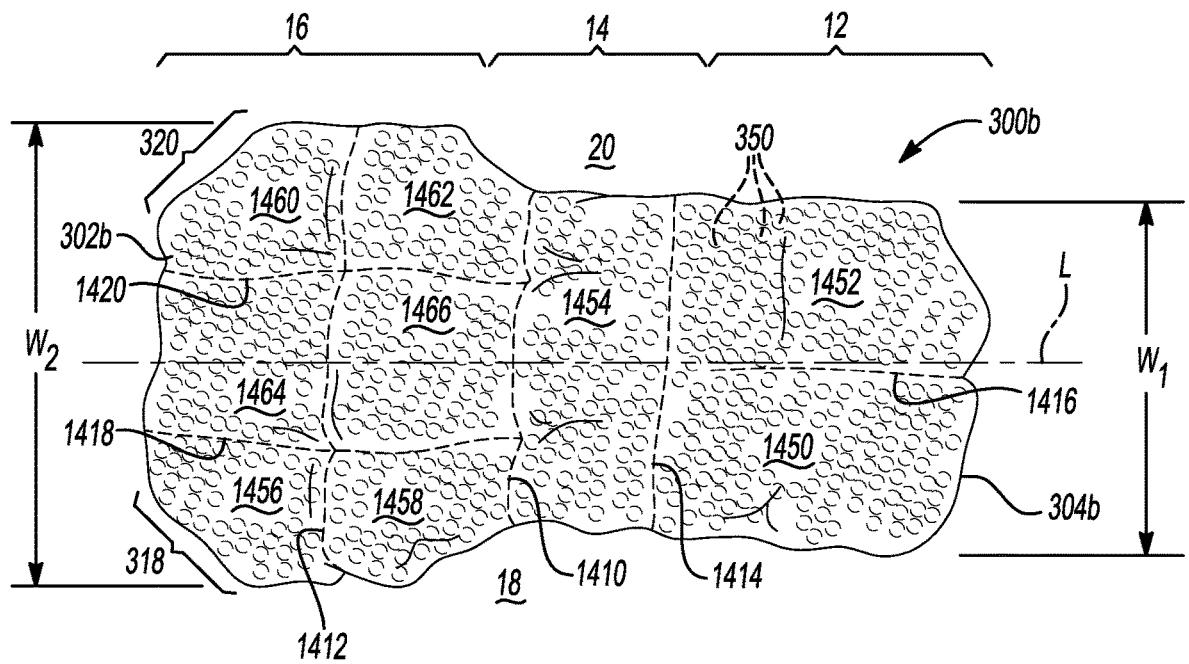
FIG. 14 is a perspective view of a casing of the article of footwear of FIG. 13 showing the casing having stitched fold lines and containing particulate matter.
Figure 15:
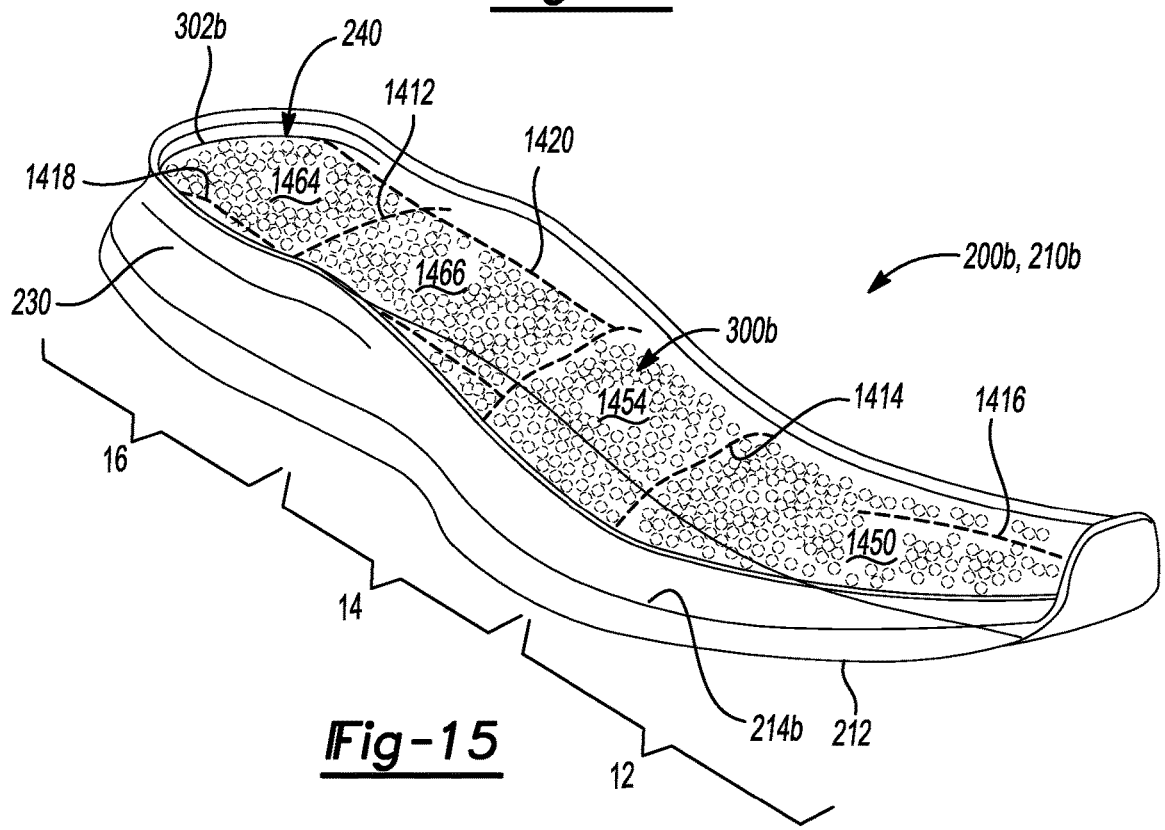
FIG. 15 is a top perspective view of an outsole of the article of footwear of FIG. 13 showing a casing folded at stitched fold lines and residing within a cavity of the outsole.
Figure 16:
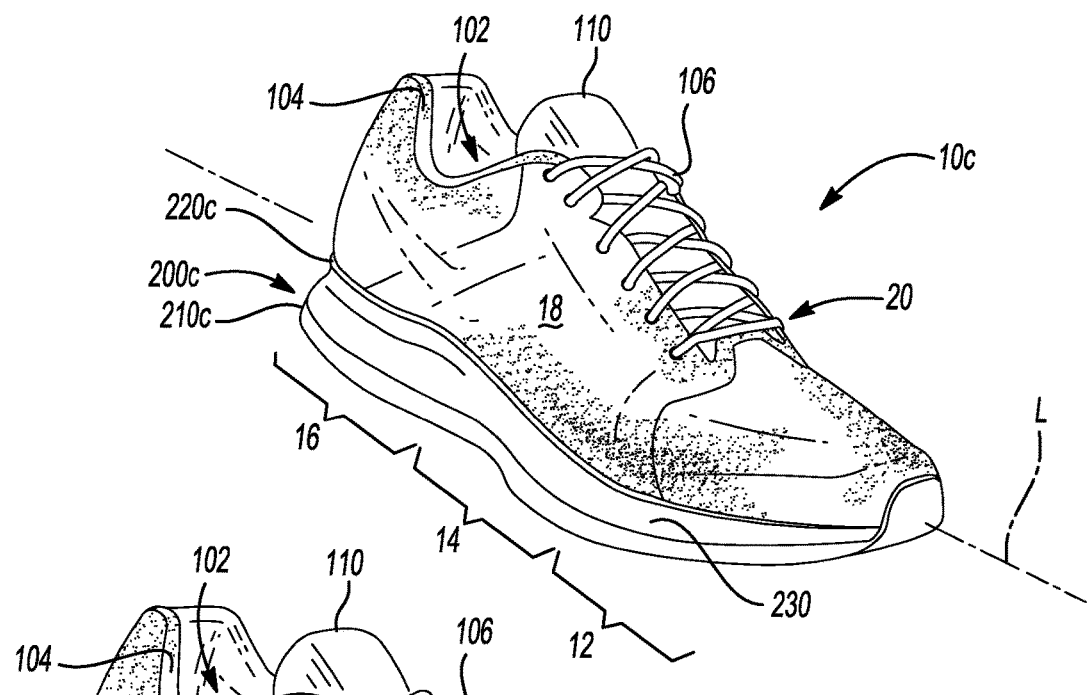
FIG. 16 is a top perspective view of an article of footwear in accordance with principles of the present disclosure.

Referring to FIGS. 13-15, in some implementations, an article of footwear 10b includes an upper 100 and a sole structure 200b attached to the upper 100. In view of the substantial similarity in structure and function of the components associated with the article of footwear 10 with respect to the article of footwear 10b, like reference numerals are used hereinafter and in the drawings to identify like components while like reference numerals containing letter extensions are used to identify those components that have been modified.

The sole structure 200b may include an outsole 210b and a midsole 220b arranged in the layered configuration. The outsole 210b includes an inner surface 214b disposed on an opposite side of the outsole 210b than the ground-engaging surface 212. The midsole 220b may be formed from a flexible material and includes a bottom surface 222b disposed on an opposite side of the midsole 220b than the footbed 224. The sidewall 230 bounds a cavity 240b between the bottom surface 222b and the inner surface 214b. The sidewall 230 may separate the bottom surface 222b and the inner surface 214b to define a depth of the cavity 240b.

In some examples, a loaf-shaped casing 300b having stitched fold lines may contain particulate matter 350 and may reside within the cavity 240b between the midsole 220b and the outsole 210b. The midsole 220b may be formed from the flexible material forming the midsole 220 of FIGS. 1-8 to provide the midsole 220b with sufficient flexibility, thereby allowing the particulate matter 350 disposed within the loaf-shaped casing 300b and residing in the cavity 240b to interact with the profile of the bottom surface of the foot during gradient loading of the sole structure 200b. FIG. 14 provides a top perspective view of the loaf-shaped casing 300b in an unfolded state and containing particulate matter 350 (e.g., foam beads). The casing 300b defines a length extending along the longitudinal axis L between a first end 302b and a second end 304b. In some configurations, the casing 300b defines a first width $W_1$ at the forefoot portion 12 of the sole structure 200b and a second width $W_2$ at the heel portion 16 of the sole structure 200b. In these configurations, the second width $W_2$ is greater than the first width $W_1$. The casing 300b may taper outward from the first width $W_1$ to the second width $W_2$ proximate to the mid-foot portion 14. Thus, a portion of the mid-foot portion 14 proximate to the forefoot portion 12 may include the first width $W_1$ and a remaining portion of the mid-foot portion 14 proximate to the heel portion 16 may include a width that tapers between the first and second widths $W_1$ and $W_2$. Similarly, a portion of the heel portion 16 proximate to the mid-foot portion 14 may include the tapering width. Additionally, in some examples, a lateral taper portion 318 and a medial taper portion 320 of the casing 300b taper inward from the second width $W_2$ and terminate at the first end 302b, thereby resulting in the first end 302b of the casing having a width substantially equal to the first width $W_1$ to accommodate the curvature of a heel area of the sole structure 200b.

The example of FIG. 14 shows the casing 300b having one or more fold lines 1410, 1412, 1414 along its length and extending substantially perpendicular to the longitudinal axis L between the lateral and medial sides 18, 20, respectively. The fold lines 1410, 1412, 1414 may be formed by securing walls of the casing 300b via stitching or other suitable fastening techniques. In the example configuration, the fold lines 1410, 1412, 1414 are stitched fold lines. Fold line 1410 may be at a predetermined location proximate to a midpoint of the casing 300b. The casing 300b may define the first width $W_1$ to the right of fold line 1410 and may begin to taper outward toward the second width $W_2$ to the left of fold line 1410. Fold line 1414 may be located between the midpoint and the second end 304b of the casing 300b. In some examples, the fold line 1414 separates the mid-foot portion 14 and the forefoot portion 12. Fold line 1412 may be located at or near the heel portion 16 between the midpoint and the first end 304b of the casing 300b. In some examples, the fold line 1412 divides the length of the heel portion 16 into halves.

Additionally, the example of FIG. 14 also shows the casing 300b having one or more fold lines 1416, 1418, 1420 extending substantially parallel to the longitudinal axis L between portions of its length. The fold lines 1416, 1418, 1420 may be formed by securing walls of the casing 300b via stitching or other suitable fastening techniques. In the example configuration, the fold lines 1416, 1418, 1420 are stitched fold lines. Fold line 1416 is located at the forefoot portion 12 and extends substantially through the center of the casing 300b between the lateral and medial sides 18, 20, respectively, from the second end 304b toward the perpendicular fold line 1414. In some examples, the fold line 1416 terminates before the perpendicular fold line 1414. In other examples, the fold line 1416 terminates at a point of contact with the perpendicular fold line 1414. Accordingly, the fold line 1416 may divide at least a portion of the width (e.g., the first width $W_1$) of the forefoot portion 12 into halves.

Fold line 1418 and fold line 1420 are located at the heel portion 16 and a portion of the forefoot portion 14. The fold line 1418 is offset between the center of the casing 300b and the lateral side 18 and extends through the perpendicular fold line 1412 between the first end 302b and the perpendicular fold line 1410. Similarly, the fold line 1420 is offset between the center of the casing 300b and the medial side 20 and extends through the perpendicular fold line 1412 between the first end 302b and the perpendicular fold line 1410. Accordingly, the fold lines 1418 and 1420 may divide the width of the casing 300b between the first end 302b and the perpendicular fold line 1410 into thirds.

In some implementations, the perpendicular fold lines 1410, 1412, 1414 and the parallel fold lines 1416, 1418, 1420 communicate with the lateral and medial sides 18, 20, respectively, and the first and second ends 302b, 304b, respectively, to define pockets each bounding corresponding quantities of the particulate matter 350. A lateral toe pocket 1450 may be formed by the parallel fold line 1416, the perpendicular fold line 1414, the second end 304b, and the lateral side 18 and a medial toe pocket 1452 may be formed by the parallel fold line 1416, the perpendicular fold line 1414, the second end 304b, and the medial side 20. The lateral and medial toe pockets 1450, 1452 may each contain corresponding quantities of the particulate matter 350 and may restrict the quantities of the particulate matter 365 from migrating outside of the corresponding pockets 1450, 1452. In some examples, portions of the particulate matter 350 are permitted to shift between adjoining pockets 1450, 1452 via a gap separating the parallel fold line 1416 and the perpendicular fold line 1414. A mid-foot pocket 1454 may be formed by the perpendicular fold lines 1410, 1414 and the lateral and medial sides 18, 20, respectively. The mid-foot pocket 1454 may contain a quantity of particulate matter 350 restricted from migrating outside of the corresponding mid-foot pocket 1454.

Referring to the heel portion 16 of the casing 300b, the larger second width $W_2$ permits two lateral heel pockets 1456 and 1458 at the lateral side 18, two medial heel pockets 1460 and 1462 at the medial side 20, and two central heel pockets 1464 and 1466 disposed therebetween. The pockets 1456-1462 may each contain a quantity of particulate matter 350 restricted from migrating outside of the corresponding pockets 1456-1462. The first lateral heel pocket 1456 is formed by the first end 302b, the lateral tapered portion 318, the lateral side 18, the perpendicular fold line 1412, and the parallel fold line 1418 and the second lateral heel pocket 1458 is formed by the perpendicular fold line 1412, the lateral side 18, the perpendicular fold line 1410, and the parallel fold line 1418. The first medial heel pocket 1460 is formed by the first end 302b, the medial taper portion 320, the medial side 20, the perpendicular fold line 1412, and the parallel fold line 1420 and the second medial heel pocket 1462 is formed by the perpendicular fold line 1412, the medial side 20, the perpendicular fold line 1410, and the parallel fold line 1420. The first central heel pocket 1464 is formed by the first end 302b, the parallel fold lines 1418, 1420 and the perpendicular fold line 1412 and the second central heel pocket 1466 is formed by the perpendicular fold lines 1412, 1410 and the parallel fold lines 1418, 1420.

In some configurations, each pocket 1450-1462 formed in the casing 300b includes approximately the same quantity of the particulate matter 350 (e.g., foam beads). However, in other configurations, one or more of the pockets 1450-1462 include different quantities of the particulate matter 350. For example, the central heel pockets 1464 and 1466 may include greater quantities of particulate matter 350 than the lateral heel pockets 1456 and 1458 and the medial heel pockets 1460 and 1462. In some scenarios, the larger second width $W_2$ at the heel portion 16 allows for the level of cushioning to be increased by permitting greater quantities of the particulate matter 350, while each of the heel pockets 1456-1462 may define relatively smaller volumetric capacities to limit movement of the corresponding quantities of particulate matter 350 residing therein. Conversely, the forefoot pockets 1450 and 1452 may define relatively larger volumetric capacities to allow the corresponding quantities of particulate matter residing therein to move responsively during gradient loading, such as when the ground-engaging surface 212 of the outsole 210b rolls for engagement with the ground surface between the heel portion 16 and the forefoot portion 12.

In addition to contributing in the formation of the pockets, the stitched fold lines 1410-1420 may allow the casing 300b to conform for placement within the cavity 240b and achieve desirable cushioning characteristics during use of the footwear 10b. Referring to FIG. 15, a top perspective view of the outsole 210b shows the casing 300b folded about the stitched fold lines and residing within the cavity 240b of the outsole 210b. The casing 300b may be folded or rolled about the parallel fold line 1416 at the forefoot portion 12 to allow the casing 300b to conform to the narrowing profile of the sole structure 200b toward the tip proximate the second end 304b of the casing 300b. At the heel portion 16, the casing 300b may be folded about each of the parallel fold lines 1418 and 1420. For example, the casing 300b may define a convex profile with the central heel pockets 1465 and 1466 slightly protruding away from the inner surface 214b of the outsole 210b when the casing 300b is folded or rolled about the fold lines 1418 and 1420 and disposed within the cavity 240b. In some examples, at least a portion of one or more of the lateral and medial heel pockets 1456, 1458, 1460, 1462 may be tucked under at least one of the central heel pockets 1464 and 1466 to create an additional layer of cushioning. The forefoot pocket 1454 may additionally be rolled so that the casing 300b achieves a desired fit within the cavity 240b at the forefoot portion 14.

Referring to FIGS. 16-19, in some implementations, an article of footwear 10c includes an upper 100 and a sole structure 200c attached to the upper 100. In view of the substantial similarity in structure and function of the components associated with the article of footwear 10 with respect to the article of footwear 10c, like reference numerals are used hereinafter and in the drawings to identify like components while like reference numerals containing letter extensions are used to identify those components that have been modified.

The sole structure 200c may include an outsole 210c and a midsole 220c arranged in the layered configuration. The outsole 210c includes an interior inner 214c disposed on an opposite side of the outsole 210c than the ground-engaging surface 212. The midsole 220c may be formed from a flexible material and includes a bottom surface 222c disposed on an opposite side of the midsole 220c than the footbed 224. The sidewall 230 bounds a cavity 240c between the bottom surface 222c and the inner surface 214c. The sidewall 230 may separate the bottom surface 222c and the inner surface 214c to define a depth of the cavity 240c.

In some configurations, a casing 300c that contains particulate matter 350 resides in the cavity 240c to provide cushioning for the foot during use of the footwear 10c. The casing 300c may define a length that extends between a first end 302c and a second end 304c. The length of the casing 300c may be greater than a length of the outsole 210c extending along the longitudinal axis L. The casing 300c and the particulate matter 350 (e.g., foam beads) residing within the cavity 240c may cooperate to enhance functionality and cushioning characteristics that a conventional midsole provides.

FIG. 17 provides an exploded view of the article of footwear 10c showing the casing 300c containing the particulate matter 350 received within the cavity 240c bounded by the sidewall 230 of the outsole 210c and between the bottom surface 222c of the midsole 220c and the inner surface 214c of the outsole 210c. In this example, the casing 300c includes a first fold 310c at a predetermined location along its length. Specifically, the first fold 310c at the predetermined location corresponds to a midpoint of the casing 300c. The example of FIG. 17 shows the first end 302c of the casing 300c being disposed proximate to the second end 304c of the casing 300c within the cavity 240c on the inner surface 214c of the outsole 210c when the casing 300c is folded at the predetermined location corresponding to the midpoint 310c. The casing 300c may define a first height $H_1$ at its midpoint 310c and define a second $H_2$ that is less than the first height $H_1$ at each of the first and second ends 302c, 304c, respectively. Accordingly, the casing 300c tapers from the midpoint 310c having the first height $H_1$ toward each of the first and second ends 302c, 304c, respectively, each having the reduced second height $H_2$. In other words, the casing 300c includes a cross-sectional area at the midpoint 310c that gradually reduces as the distance toward each of the first and second ends 302c, 304c, respectively, decreases, thereby allowing the casing 300c to contain greater quantities of the particulate matter 350 proximate to the midpoint 310c than quantities of the particulate matter 350 contained by the casing 300c proximate to the first and second ends 302c, 304c, respectively.

Referring to FIG. 18, a top perspective view of the outsole 210c shows the casing 300c containing the particulate matter 350 and including the first fold 310c at its midpoint while disposed within the cavity 240c on the inner surface 214c. In some examples, the casing 300c between the midpoint 310c and the first end 302c is bounded by the lateral side 18 of the sidewall 230 and the casing 300c between the midpoint 310c and the second end 304c is bounded by the medial side 20 of the sidewall 230. The particulate matter 350 residing within the casing 300c may compress at one or more of the portions 12, 14, 16 of the sole structure 200c to attenuate ground-reaction forces when gradient loads are applied thereto. In some examples, the casing 300c is formed from a flexible material. The casing 300c may optionally be formed from a mesh material. Additionally or alternatively, the casing 300c may be formed from a nylon material. Thus, the casing 300c may be formed from one or more of the flexible material, the mesh material, and/or the nylon material. Optionally, the casing 300c may be formed from any suitable material that allows the received particulate matter 350 to conform to the sole structure 200c, such as surface profiles of the inner and bottom surfaces 214c, 222c, respectively, as well as the contour of the sidewall 230.

The midsole 220c may be formed from the flexible material forming the midsole 220 of FIGS. 1-8 to provide the midsole 220c with sufficient flexibility, thereby allowing the particulate matter 350 disposed within the casing 300c and residing in the cavity 240c to interact with the profile of the bottom surface of the foot during gradient loading of the sole structure 200c.

The casing 300c—when folded at the midpoint 310c and disposed within the cavity 240c—tapers downward from the first height $H_1$ at heel portion 16 of the sole structure 200c to the second height $H_2$ at the forefoot portion 12 of the sole structure 200c. Thus, larger quantities of particulate matter 350 may reside within the casing 300c at the heel portion 16 to increase the level of cushioning. Different portions along the length of the casing 300c may partially or entirely fill the cavity 240c. For example, the casing 300c disposed within the cavity 240c proximate to the heel portion 16 having the first height $H_1$, may exceed the height of the sidewall 230. In other examples, the casing 300c at the first height $H_1$ is less than or equal to the height of the sidewall 230. As described above, the casing 300c tapers from the midpoint 310c toward the ends 302c, 304c disposed within the cavity 240c proximate to forefoot portion 12 and having the second height $H_2$. In some examples, the casing 300c at the ends 302c, 304c having the second height $H_2$ exceeds the height of the sidewall 230. In other examples, the casing at the ends 302c, 304c having the second height $H_2$ is less than or equal to the height of the sidewall 230. In the examples, when at least a portion of the casing 300c has a height exceeding the height of the sidewall (e.g., exceeding the depth of the cavity 240c), the casing 300c containing the particulate matter 350 is compressed between the inner surface 214c of the outsole 210c and the bottom surface 222c of the midsole 220c when the sole structure 200c is assembled.

FIG. 18 shows the casing 300c, when disposed within the cavity 240c, enclosing an interior void 1840 between the inner surface 214c of the outsole 210c and the bottom surface 222c of the midsole 220c. In some implementations, at least one additional casing is disposed within the cavity 240c and is situated therein to at least partially fill the interior void 1840 enclosed by the casing 300c. In some examples, the additional casing may include a loaf-shaped casing containing particulate matter 350 similar to the loaf-shaped casing 300a of FIGS. 9-12. For instance, the loaf-shaped casing may include a size and shape sufficient to reside within the interior void 1840 between the inner surface 214c and the bottom surface 222c and bounded by the casing 300c. In other examples, the additional casing containing particulate matter 350 may include a casing similar to the casing 300c. For instance, the additional casing may define a length that is shorter than the length of the casing 300c so that when the additional casing is folded about its midpoint, the additional casing may be situated within the interior void 1840 between the inner surface 214c and the bottom surface 222c and bounded by casing 300c. In these examples, the casing may taper away from its midpoint toward opposite ends as described in the foregoing with respect to the casing 300c. Optionally, loose particulate matter 350 may be disposed within the cavity 240c to at least partially fill the interior void 1840 enclosed by the casing 300c. Accordingly, by at least partially filling the interior void 1840 with an additional casing containing particulate matter 350 and/or with loose particulate matter 350, the level of soft-type cushioning may be enhanced during use of the footwear 10c in areas proximate thereto.

FIG. 19 shows a perspective view of the casing 300c of the article of footwear 10c containing the particulate matter 350 and including the first fold 310c at its midpoint (e.g., predetermined location) when the casing 300c is in an unfolded state. When the casing 300c is folded and disposed within the cavity 240c, repeated compressions by the sole structure 200c may cause the first fold 310c to loosen, unravel, or otherwise partially unfold, in response to particulate matter 350 shifting within the casing 300c. Under these scenarios, the particulate matter 350 may migrate from one side of the midpoint 310c to the other side of the midpoint 310c, thereby resulting in a non-uniform distribution of particulate matter 350 residing in the casing 300c that causes some areas of the casing 300c to provide little to no cushioning. In some implementations, to prevent the first fold 310c from unfolding, the casing 300c includes stitching 926 to define the predetermined location (e.g., the midpoint) corresponding to the first fold 310c. Similar to the article of footwear 10 described above with reference to FIGS. 1-6, one or more portions of walls of the casing 300c may be secured together by the stitching 926 or other fastening techniques to define the predetermined location (e.g., the midpoint) and maintain the first fold 310c. Securing the first fold 310c at the midpoint restricts the particulate matter 350 from freely moving throughout the casing 300c across the midpoint of the casing 300c and facilitates bending of the casing 300c and, thus, assembly of the casing 300c into the cavity 240c.

In some implementations, the particulate matter 350 (e.g., foam beads) slightly over fills (e.g., stuffs) the casing 300c to permit the particulate matter 350 to occupy all voids enclosed within the casing 300c, thereby expanding the casing 300c to provide a substantially uniform and smooth surface profile. The casing 300 may have a substantially rectangular-shaped cross-section in some configurations. However, in other configurations, the casing 300c may have circular-, triangular-, or polygonal-shaped cross-sections. In some configurations, the casing 300c defines one internal region enclosing the particulate matter 350, as shown in FIG. 7. In other configurations, the casing 300c includes one or more dividers for defining two or more internal regions each enclosing a corresponding quantity of the particulate matter 350, as shown in FIG. 8. Optionally, the casing 300c may include a single internal region at some portions along its length and may also define two or more internal regions along other portions along its length.

Figure 20:
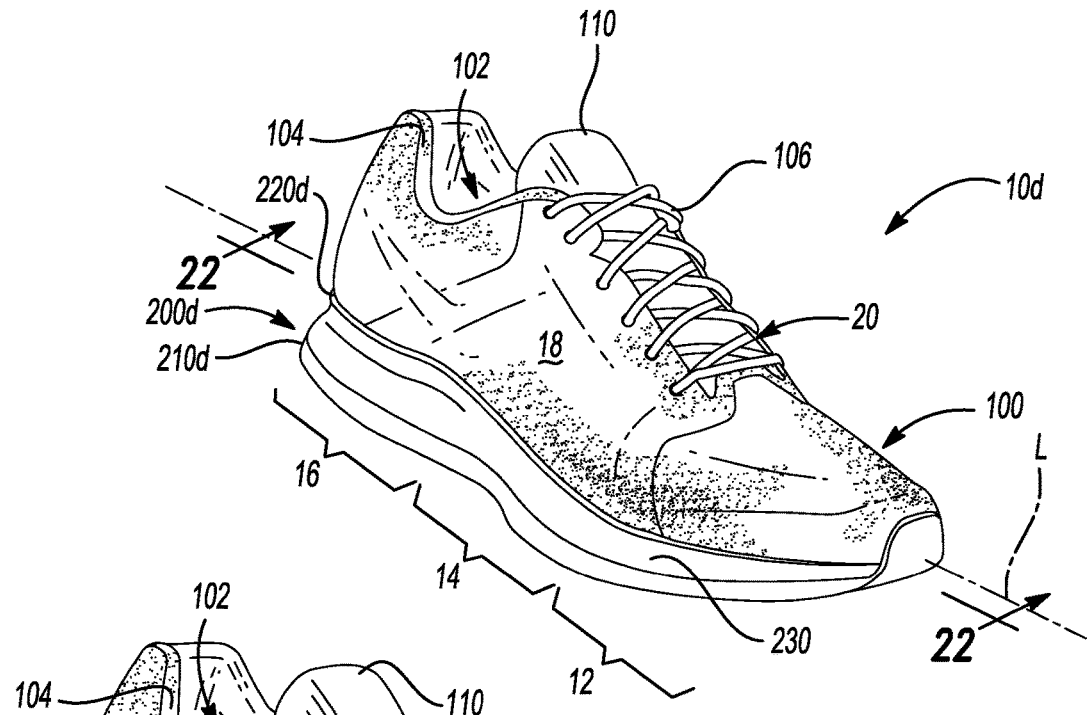
FIG. 20 is a top perspective view of an article of footwear in accordance with principles of the present disclosure.
Figure 21:
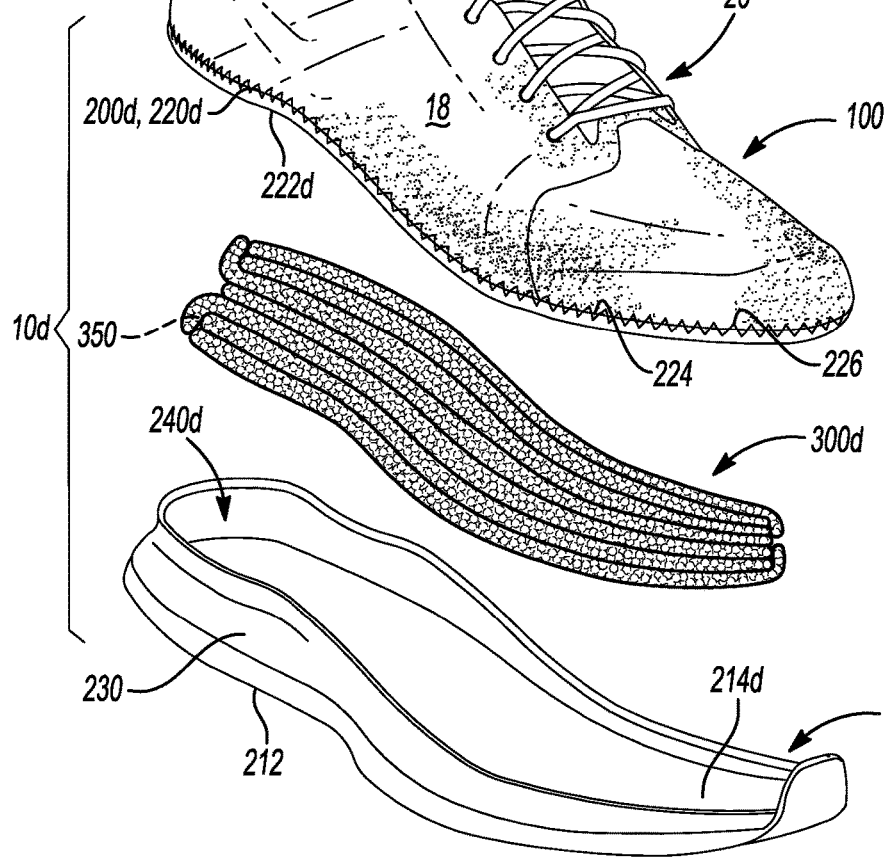
FIG. 21 is an exploded view of the article of footwear of FIG. 20 showing a plurality of stacked, tube-shaped casings each containing particulate matter and disposed between a midsole and an inner surface of an outsole of the article of footwear.
Figure 22:
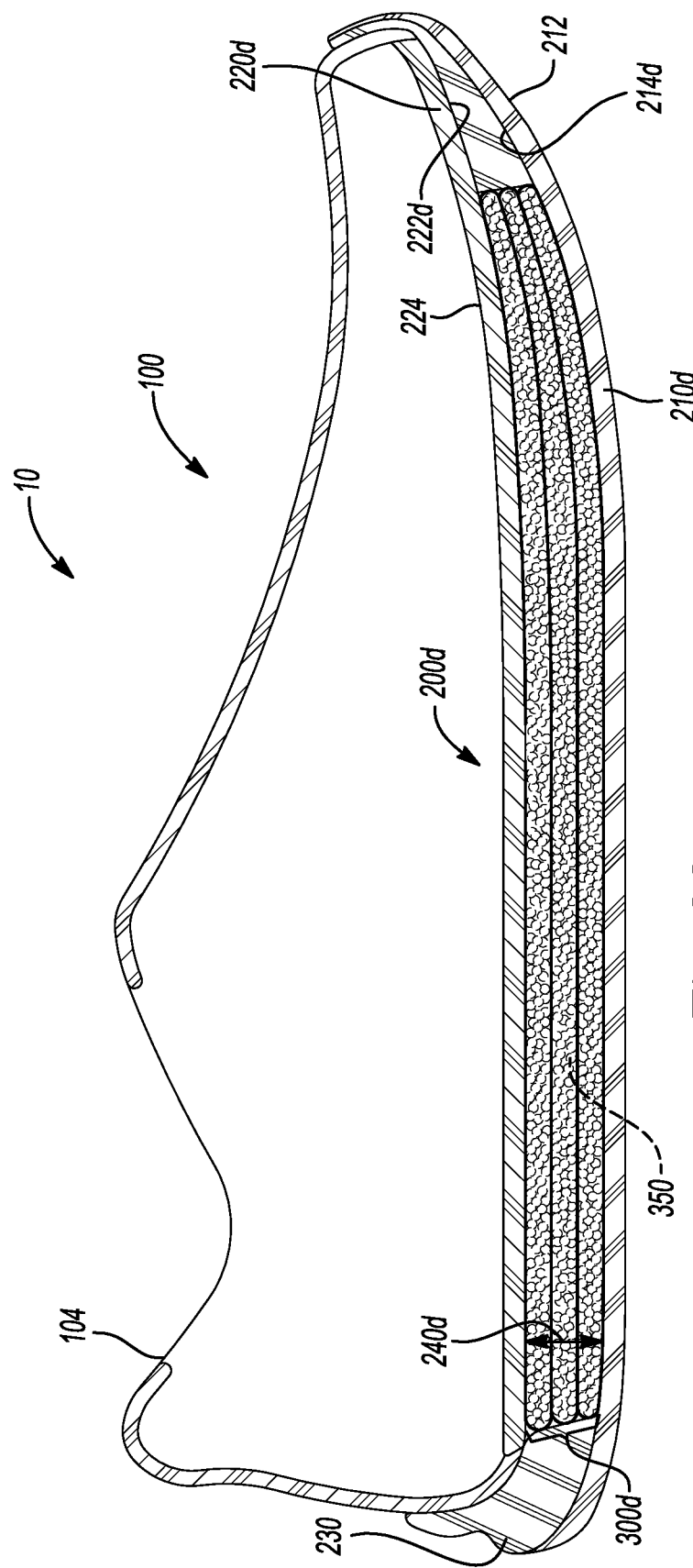
FIG. 22 is a cross-sectional view taken along line 22-22 of FIG. 20 showing a plurality of stacked, tube-shaped casings each containing particulate matter and received within a cavity disposed between a midsole and an inner surface of an outsole of the article of footwear.

Referring to FIGS. 20-22, in some implementations, an article of footwear 10d includes an upper 100 and a sole structure 200d attached to the upper 100. In view of the substantial similarity in structure and function of the components associated with the article of footwear 10 with respect to the article of footwear 10d, like reference numerals are used hereinafter and in the drawings to identify like components while like reference numerals containing letter extensions are used to identify those components that have been modified.

The sole structure 200d may include an outsole 210d and a midsole 220d arranged in the layered configuration. The outsole 210d includes an inner surface 214d disposed on an opposite side of the outsole 210d than the ground-engaging surface 212. The midsole 220d may be formed from a flexible material and includes a bottom surface 222d disposed on an opposite side of the midsole 220d than the footbed 224. The sidewall 230 bounds a cavity 240d between the bottom surface 222d and the inner surface 214d. The sidewall 230 may separate the bottom surface 222d and the inner surface 214d to define a depth of the cavity 240d.

In some configurations, tube-shaped casings 300d each containing particulate matter 350 are disposed within the cavity 240d. The tube-shaped casings 300d may be disposed within the cavity 240 in groups of two or more casings arranged in a stacked or layered configuration. For example, one or more tube-shaped casings 300d may be arranged on the inner surface 214d of the outsole 210d, while other tube-shaped casings 300d may be arranged overtop one another to form two or more layers that at least partially fill the cavity 240d. FIG. 21 provides an exploded view of the article of footwear 10d showing the tube-shaped casings 300d each having a length extending along the longitudinal axis L through at least a portion of one or more of the forefoot, mid-foot, and heel portions 12, 14, 16, respectively. In other configurations, however, the tube-shaped casings 300d may have a length extending perpendicular to the longitudinal axis L. The plurality of tube-shaped casings 300d may be uniform in length or at least one of the casings 300d may have a different length. FIG. 21 shows three groups of three tube-shaped casings 300d arranged in a stacked configuration, whereby the casings 300d have a size and shape substantially conforming to the outline of the midsole 220d and the outsole 210d.

Each tube-shaped casing 300d, when filled with the particulate matter 350, also includes a volume that at least partially fills the cavity 240d. Additionally, each tube-shaped casing 300d defines a cross-sectional area. The volume and cross-sectional area of each tube-shaped casing 300d may be the same, or at least one tube-shaped casing 300d may have a different volume and cross-sectional area. In some examples, the cross-sectional area may vary (e.g., via tapering) across the length of one or more of the tube-shaped casings 300d, thereby permitting the quantity of particulate matter 350 to vary along the length of a given tube-shaped casing 300d.

Some movement of particulate matter 350 may be permitted along the length of each tube-shaped casing 300d to provide fluid cushioning during gradient loading of the sole structure 200d. Adjusting the cross-sectional area and/or volume of each tube-shaped casing 300d prescribes the quantity of the particulate matter 300d permitted to reside therein. For instance, it may be desirable to include a greater quantity of particulate matter 350 within the tube-shaped casings 300d located proximate to the heel portion 16 to increase the level of soft-type cushioning at the heel area of the foot. Thus, by varying the quantity of particulate matter 300d residing in each tube-shaped casing 300d, in addition to how the casings 300d are situated within the cavity 240d (e.g., stacked and layered), a desirable degree of soft-type cushioning can be set to attenuate ground reaction forces felt by a wearer of the footwear 10d during gradient loading of the sole structure 200d, such as during walking or running movements.

The midsole 220d may be formed from the flexible material forming the midsole 220 of FIGS. 1-8 to provide the midsole 220d with sufficient flexibility, thereby allowing the particulate matter 350 disposed within each tube-shaped casing 300d and residing in the cavity 240d to interact with the profile of the bottom surface of the foot during gradient loading of the sole structure 200d.

In some implementations, the tube-shaped casings 300d are fastened or secured together to restrict the casings 300d from moving independently relative to one another. In other examples, at least one of the tube-shaped casings 300d is freely movable relative to the other tube-shaped casings 300d. In some configurations, a single tube-shaped casing 300d includes a length longer than a length of the outsole 210d, thereby allowing the tube-shaped casing 300d to be bent, twisted, or coiled so that the casing 300d overlies the inner surface 213d of the outsole 210d between the lateral and medial sides 18, 20 respectively. In these configurations, additional tube-shaped casings 300d may by layered over top one another to at least partially fill the cavity 240d.

Referring to FIG. 22, a cross-sectional view taken along line 22-22 of FIG. 20 shows the plurality of tube-shaped casings 300d arranged in the layered configuration and received within the cavity 240d bounded by the sidewall 230 and between the bottom surface 222d and the inner surface 214d. Each tube-shaped casing 300d contains a quantity of particulate matter 350 and includes an interior wall that surrounds and encloses the particulate matter 350 residing therein. The particulate matter 350 residing within each tube-shaped casing 300d may compress at one or more of the portions 12, 14, 16 of the sole structure 200d to attenuate ground-reaction forces when gradient loads are applied thereto. In some examples, the tube-shaped casings 300d are formed from a flexible material. The flexible material may provide sufficient flexibility so that one or more of the tube-shaped casings 300d can be coiled. For instance, each tube-shaped casing 300d may be formed from a mesh material and/or the nylon material that forms the tube-shaped casing 300 of FIGS. 1-8. Accordingly, each tube-shaped casing 300d may allow the received particulate matter 350 to conform to the sole structure 200d, such as surface profiles of the inner and bottom surfaces 214d, 222d, respectively, as well as the contour of the sidewall 230.

The volume defined by each of the tube-shaped casings 300d for receiving particulate matter 350 is less than the volume defined by each of the aforementioned casings 300, 300a, 300b, 300c described above with reference to FIGS. 1-19. In other words, each tube-shaped casing 300d contains a smaller quantity of particulate matter 350 compared to the quantities of particulate matter 350 residing within each of the aforementioned casings 300, 300a, 300b, 300c. The sum of the quantities of the particulate matter 350 contained among all of the tube-shaped casings 300d disposed within the cavity 240d, however, may be substantially equal to the quantities of particulate matter 350 residing within each of the aforementioned casings 300, 300a, 300b, 300c. Accordingly, the smaller volumes defined by the tube-shaped casings 300d restrict the degree by which the corresponding quantities of particulate matter 350 residing therein move or shift after the sole structures 200d compresses, thereby preventing uneven distribution of the particulate matter 350 throughout the sole structure 200d.

Figure 23:
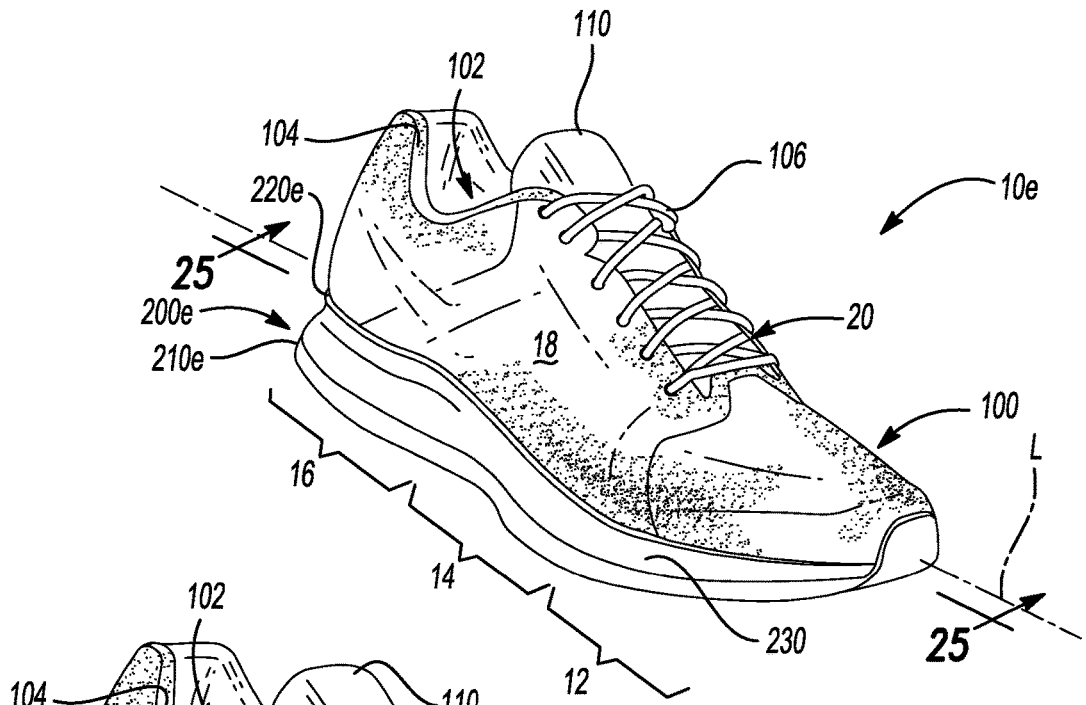
FIG. 23 is a top perspective view of an article of footwear in accordance with principles of the present disclosure.
Figure 24:
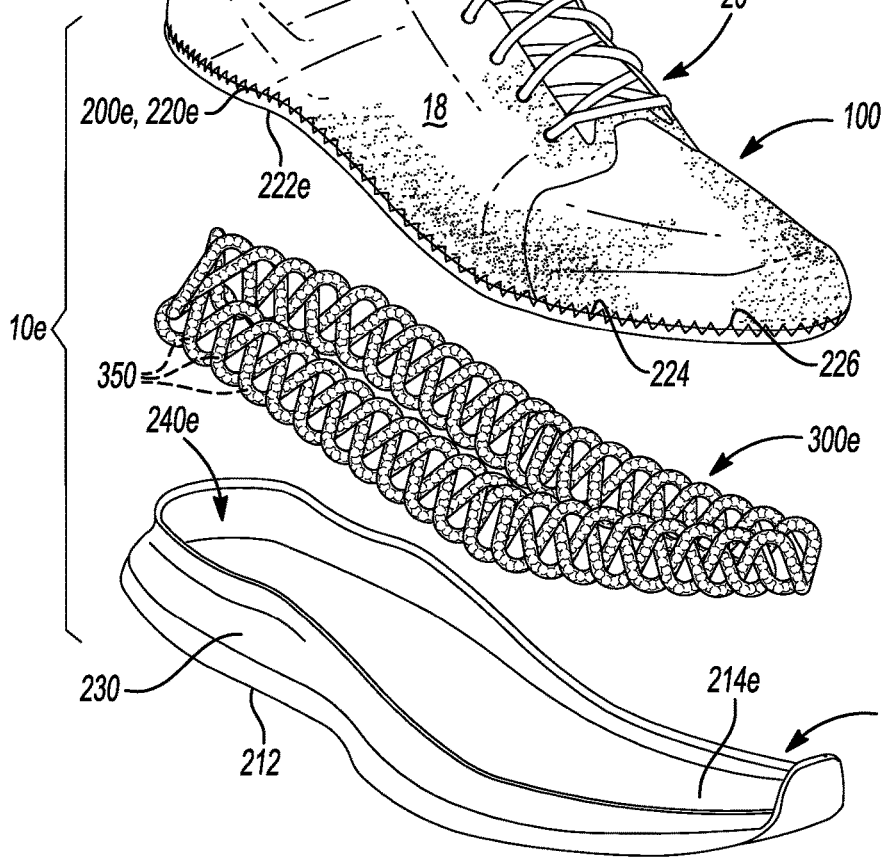
FIG. 24 is an exploded view of the article of footwear of FIG. 23 showing a plurality of braided, tube-shaped casings each containing particulate matter and disposed between a midsole and an inner surface of an outsole of the article of footwear.
Figure 25:
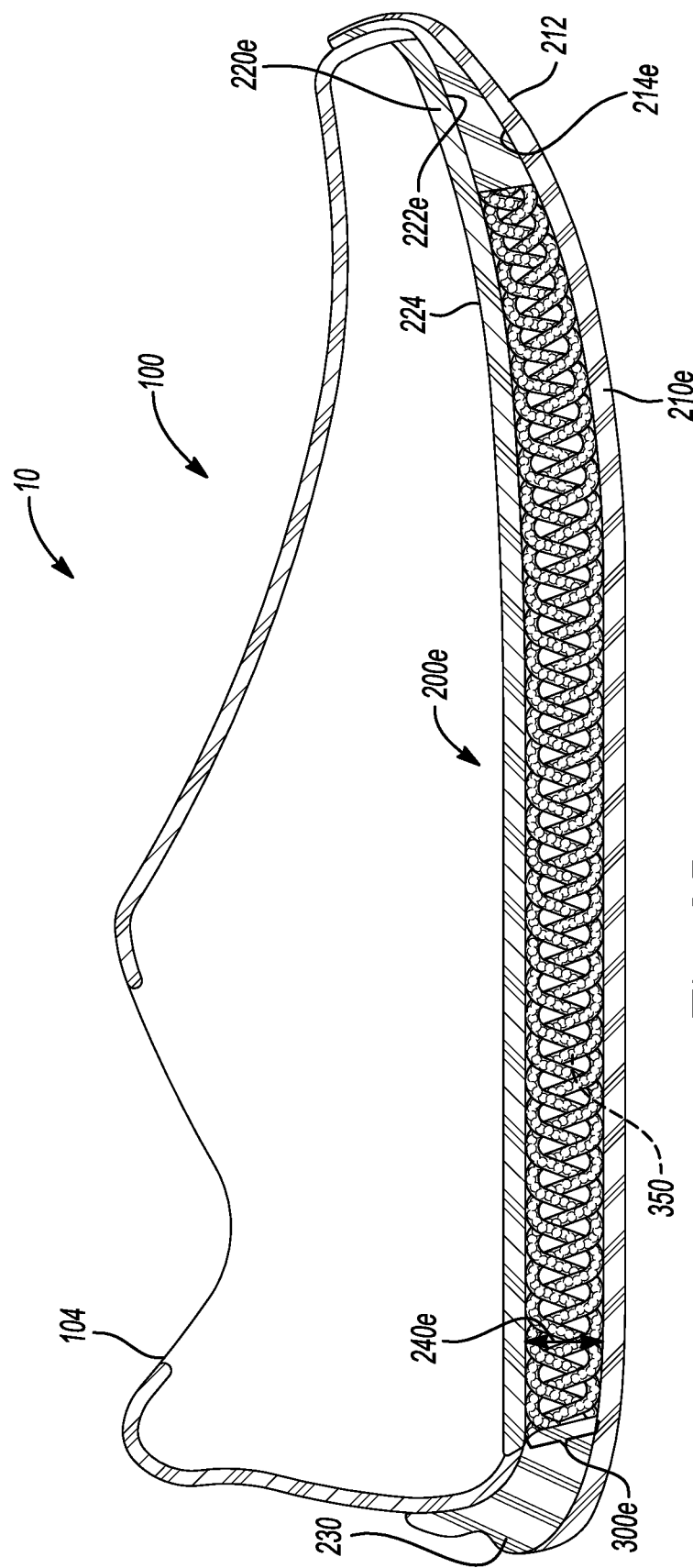
FIG. 25 is a cross-sectional view taken along line 25-25 of FIG. 23 showing a plurality of braided tube-shaped casings each containing particulate matter and received within a cavity disposed between a midsole and an inner surface of an outsole of the article of footwear.

Referring to FIGS. 23-25, in some implementations, an article of footwear 10e includes an upper 100 and a sole structure 200e attached to the upper 100. In view of the substantial similarity in structure and function of the components associated with the article of footwear 10 with respect to the article of footwear 10e, like reference numerals are used hereinafter and in the drawings to identify like components while like reference numerals containing letter extensions are used to identify those components that have been modified.

The sole structure 200e may include an outsole 210e and a midsole 220e arranged in the layered configuration. The outsole 210e includes an inner surface 214e disposed on an opposite side of the outsole 210e than the ground-engaging surface 212. The midsole 220e may be formed from a flexible material and includes a bottom surface 222e disposed on an opposite side of the midsole 220e than the footbed 224. The sidewall 230 bounds a cavity 240e between the bottom surface 222e and the inner surface 214e. The sidewall 230 may separate the bottom surface 222e and the inner surface 214e to define a depth of the cavity 240e.

In some configurations, a plurality of tube-shaped casings 300e each containing particulate matter 350 may reside within the cavity 240e in a weaved or braided configuration. For example, one or more groups of two or more tube-shaped casings 300e may be braided together and arranged on the inner surface 214e of the outsole 210e to at least partially fill the cavity 240e. FIG. 24 provides an exploded view of the article of footwear 10e showing the tube-shaped casings 300e each having a length extending along the longitudinal axis L through at least a portion of one or more of the forefoot, mid-foot, and heel portions 12, 14, 16, respectively. The casings 300e may include a length longer than a length of the outsole 210e prior to being weaved or braided together. Upon waving or braiding together two or more tube-shaped casings 300e, the casings 300e may be situated on the inner surface 214e of the outsole 210e. In some examples, the tube-shaped casings 300e may be stuffed within the cavity 240e to provide an interference fit between the tube-shaped casings 300e and the inner surface 214e, the bottom surface 222e, and the sidewall 230. The plurality of tube-shaped casings 300e may be uniform in length or at least one of the casings 300e may have a different length. FIG. 24 shows two groups each having a braided configuration of three tube-shaped casings 300e, whereby the braided configurations of tube-shaped casings 300e may have a size and shape substantially conforming to the outline of the midsole 220e and the outsole 210e.

Each tube-shaped casing 300e, when filled with the particulate matter 350, also includes a volume that at least partially fills the cavity 240e. Additionally, each tube-shaped casing 300e defines a cross-sectional area. The volume and cross-sectional area of each tube-shaped casing 300e may be the same, or at least one tube-shaped casing 300e may have a different volume and cross-sectional area. In some examples, the cross-sectional area may vary, via tapering, across the length of one or more of the tube-shaped casings 300e. For instance, it may be desirable to include a greater quantity of particulate matter 350 within the tube-shaped casings 300e located proximate to the heel portion 16 to increase the level of soft-type cushioning at the heel area of the foot. In some implementations, fastening or securing the tube-shaped casings 300e together at one or more locations may restrict the braid from loosening or becoming undone. Additionally or alternatively, each group of braided tube-shaped casings 300e may be fastened or secured together to restrict the groups from moving independently relative to one another. In other examples, one or more of the groups of braided tube-shaped casings 300e are freely movable relative to one another.

Referring to FIG. 25, a cross-sectional view taken along line 25-25 of FIG. 23 shows one group of the tube-shaped casings 300e arranged in the braided configuration and received within the cavity 240e bounded by the sidewall 230 and between the bottom surface 222e and the inner surface 214e. Each tube-shaped casing 300e contains a quantity of particulate matter 350 and includes an interior wall that surrounds and encloses the particulate matter 350 residing therein. The particulate matter 350 residing within each tube-shaped casing 300e may compress at one or more of the portions 12, 14, 16 of the sole structure 200e to attenuate ground-reaction forces when gradient loads are applied thereto. In some examples, the tube-shaped casings 300e are formed from a flexible material sufficient to provide each tube-shaped casing 300e with enough flexibility to be braided or weaved. For instance, each tube-shaped casing 300e may be formed from a mesh material and/or the nylon material that forms the tube-shaped casing 300 of FIGS. 1-8. Accordingly, each tube-shaped casing 300e may allow the received particulate matter 350 to conform to the sole structure 200e, such as surface profiles of the inner and bottom surfaces 214e, 222e, respectively, as well as the contour of the sidewall 230.

The midsole 220e may be formed from the flexible material forming the midsole 220 of FIGS. 1-8 to provide the midsole 220e with sufficient flexibility, thereby allowing the particulate matter 350 within each tube-shaped casing 300e and residing in the cavity 240e to interact with the profile of the bottom surface of the foot during gradient loading of the sole structure 200e.

The volume defined by each of the tube-shaped casings 300e for receiving particulate matter 350 is less than the volume defined by each of the aforementioned casings 300, 300a, 300b, 300c described above with reference to FIGS. 1-19. In other words, each tube-shaped casing 300e contains a smaller quantity of particulate matter 350 compared to the quantities of particulate matter 350 residing within each of the aforementioned casings 300, 300a, 300b, 300c. The sum of the quantities of the particulate matter 350 contained among all of the tube-shaped casings 300e disposed within the cavity 240e, however, may be substantially equal to the quantities of particulate matter 350 residing within each of the aforementioned casings 300, 300a, 300b, 300c. Accordingly, the smaller volumes defined by the tube-shaped casings 300e restrict the degree by which the corresponding quantities of particulate matter 350 residing therein move or shift after the sole structures 200e compresses, thereby preventing uneven distribution of the particulate matter 350 throughout the sole structure 200e. Moreover, as the braided configuration of the plurality of tube-shaped casings 300e requires each tube-shaped casing 300e to bend and oscillate along its entire length, the bends and oscillations along the length of each tube-shaped casing 300e create boundaries that restrict unfettered movement by the particulate matter 350 residing therein.

Referring to FIGS. 26-28, in some implementations, an article of footwear 10f includes an upper 100 and a sole structure 200f attached to the upper 100. In view of the substantial similarity in structure and function of the components associated with the article of footwear 10 with respect to the article of footwear 10f, like reference numerals are used hereinafter and in the drawings to identify like components while like reference numerals containing letter extensions are used to identify those components that have been modified.

The sole structure 200f may include an outsole 210f and a midsole 220f arranged in the layered configuration. The outsole 210f includes an inner surface 214f disposed on an opposite side of the outsole 210f than a ground-engaging surface 212f. The midsole 220f may be formed from a flexible material and includes a bottom surface 222f disposed on an opposite side of the midsole 220f than the footbed 224. The sidewall 230 bounds a cavity 240f between the bottom surface 222f and the inner surface 214f. The sidewall 230 may separate the bottom surface 222f and the inner surface 214f to define a depth of the cavity 240f.

In some implementations, a tufted casing 300f containing particulate matter 350 and a cushioning layer 400 reside within the cavity 240f. FIG. 27 provides an exploded view of the article of footwear 10f showing the tufted casing 300f and the cushioning layer 400 each having a length extending along the longitudinal axis L and a width extending between the lateral and medial sides 18, 20, respectively. The tufted casing 300f and the cushioning layer 400 may be sized and shaped to substantially conform to the outline of the midsole 220f and the outsole 210f. The cushioning layer 400 may rest between, and in contact with, the inner surface 214f of the outsole 210f and the tufted casing 300f when the sole structure 200f is assembled. The cushioning layer 400 may include a contoured structure that forms a plurality of ridges 410 along surfaces of the cushioning layer 400 to define an egg-crate shape. The cushioning layer 400 may be formed from one or more polymer foam materials, such as ethyl-vinyl-acetate or polyurethane. In some configurations, the ground-engaging surface 212f includes indentations that form a plurality of projections 420 extending into the cavity 240f from the inner surface 214f of the outsole 214f. Each projection 420 may be aligned with a corresponding ridge 410 of the cushioning layer 400 that opposes the outsole 210f.

In some implementations, the tufted casing 300f is formed from a flexible material such as a mesh material and/or a nylon material that form the tube-shaped casing 300 of FIGS. 1-8. A first end 302f of the tufted casing 300f resides proximate to the heel portion 16 and a second end 304f of the tufted casing 300f resides proximate to the forefoot portion 12 when the casing 300f lies overtop the cushioning layer 400. The tufted casing 300f may nest upon the top contoured surface of the cushioning layer 400. The tufted casing 300f may be formed by tufting, joining, or fastening central regions inside the perimeter of the casing 300f to define tufted regions or pockets 340 each filled with a corresponding quantity of particulate matter 350. The pockets 340 may extend along the length of the casing 300f between the first end 302f and the second end 304f as well as between the lateral and medial sides 18, 20, respectively, of the sole structure 200f. In some examples, each pocket 340 includes approximately the same quantity of particulate matter 350, while in other examples, at least one of the pockets 340 includes a different quantity of particulate matter 350. For instance, it may be desirable to include a greater quantity of particulate matter 350 within pockets 340 located proximate to the heel portion 16 to increase the level of soft-type cushioning at the heel area of the foot.

The midsole 220f may be formed from the flexible material forming the midsole 220 of FIGS. 1-8 to provide the midsole 220f with sufficient flexibility, thereby allowing the particulate matter 350 disposed within each pocket 340 and residing in the cavity 240f to interact with the profile of the bottom surface of the foot during gradient loading of the sole structure 200f.

The pockets 340 may inhibit movement and migration of the particulate matter 350 throughout the tufted casing 300f. For instance, the pockets 340 may define walls having interstitial spaces sufficient to inhibit unfettered movement of the particulate matter 350 between adjoining pockets 340. In some examples, the pockets 340 include partially open walls so that some movement of particulate matter 350 may occur between adjoining pockets during gradient loading of the sole structure 200f. In other examples, the pockets 340 include closed walls so that the corresponding quantities of particulate matter 350 are restricted from migrating to adjoining pockets during gradient loading of the sole structure 200f. In these examples, however, some movement of particulate matter 350 is permitted within the corresponding pockets 340 to provide fluid cushioning during gradient loading of the sole structure 200f. In other words, the pockets 340 are effective to prevent the loss of cushioning in areas of the sole structure 200f caused by particulate matter 350 migration during repeated compressions of the sole structure 200f but permit movement of the particulate matter 350 within each pocket 340.

Referring to FIG. 28, a cross-sectional view taken along line 28-28 of FIG. 26 shows the tufted casing 300f containing particulate matter 350 and the cushioning layer 400 received within the cavity 240f bounded by the sidewall 230 and between the bottom surface 222f and the inner surface 214f. FIG. 28 shows each ridge 410 of the cushioning layer 400 that opposes the outsole 210f being supported by a corresponding one of the projections 420 extending into the cavity 240f from the inner surface 214f formed by the indentations in the ground-engaging surface 212f. The pairs of ridges 410 and projections 420 within the cavity 240f may cooperate to provide resilient compressibility under an applied load to attenuate ground-reaction forces. For example, the pairs of ridges 410 and projections 420 may compress against each other under load to provide a spring-type effect that dampens the magnitude of the impact on the foot of the wearer of the footwear 10f. In some examples, voids between pairs of ridges 410 and projections 420 may be filled with particulate matter 350 (not shown). In addition to the resilient compressibility provided by the pairs of ridges 410 and projections 420, the pockets 340 containing particulate matter 350 may provide a level of soft-type cushioning in response to ground-reaction forces. Accordingly, the pockets 340 containing particulate matter 350 in cooperation with the pairs of ridges 410 and projections 420 may enhance functionality and cushioning characteristics that a conventional midsole provides by providing cushioning from soft to responsive during gradient loading of the sole structure 200f that changes as the applied load changes (i.e., the greater the load, the more the projections 420 are compressed and, thus, the more responsive the footwear 10f performs).

The following Clauses provide an exemplary configuration for the sole structure for an article of footwear described above.

Clause 1: An article of footwear comprising an upper and a midsole attached to the upper and including a footbed and a bottom surface disposed on an opposite side of the midsole than the footbed. The outsole having a ground-engaging surface, an inner surface disposed on an opposite side of the outsole than the ground-engaging surface, and a wall extending from the ground-engaging surface and surrounding the outsole. The casing containing particulate matter and having a length that is greater than a length of the outsole, the casing including a first fold at a predetermined location along its length and received within a cavity bounded by the wall of the outsole and between the bottom surface and the inner surface.

Clause 2: The article of footwear of Clause 1, wherein the predetermined location is at or proximate to a midpoint of the casing.

Clause 3: The article of footwear of Clause 1, wherein the predetermined location is disposed between a midpoint of the casing and an end of the casing.

Clause 4: The article of footwear of Clause 1, wherein the casing includes a first end and a second end, the first end disposed proximate to the second end within the outsole when the casing is folded at the predetermined location.

Clause 5: The article of footwear of any of the preceding Clauses, wherein the casing if formed from a flexible material.

Clause 6: The article of footwear of any of the preceding Clauses, wherein the casing is formed from a mesh material.

Clause 7: The article of footwear of any of the preceding Clauses, wherein the casing is formed from a nylon material.

Clause 8: The article of footwear of any of the preceding Clauses, wherein the casing includes stitching to define the predetermined location.

Clause 9: The article of footwear of any of the preceding Clauses, wherein walls of the casing are secured together to define the predetermined location.

Clause 10: The article of footwear of any of the preceding Clauses, wherein walls of the casing are secured together to define at least two pockets each containing a quantity of the particulate matter.

Clause 11: The article of footwear of Clause 10, wherein the at least two pockets include approximately the same quantity of the particulate matter.

Clause 12: The article of footwear of Clause 10, wherein the at least two pockets include different quantities of the particulate matter.

Clause 13: The article of footwear of any of the preceding Clauses, wherein the particulate matter includes foam beads.

Clause 14: The article of footwear of Clause 13, wherein the foam beads include a substantially spherical shape.

Clause 15: The article of footwear of Clause 13, wherein the foam beads include approximately the same size and shape.

Clause 16: The article of footwear of Clause 13, wherein the foam beads include at least one of a different size and shape.

Clause 17: The article of footwear of Clause 1, further comprising a second fold located along a length of the casing between the predetermined location and a first end of the casing.

Clause 18: The article of footwear of Clause 17, further comprising a third fold located along a length of the casing between the predetermined location and a second end of the casing, the second end disposed on an opposite end of the casing than the first end.

Clause 19: An article of footwear comprising an upper and a midsole attached to the upper and including a footbed and a bottom surface disposed on an opposite side of the midsole than the footbed. The outsole having a ground-engaging surface, an inner surface disposed on an opposite side of the outsole than the ground-engaging surface, and a wall extending from the ground-engaging surface and surrounding the outsole. The casing containing particulate matter and having a length that is greater than a length of the outsole, the casing having at least one fold at a predetermined location along its length and received within a cavity bounded by the wall of the outsole and between the bottom surface and the inner surface.

Clause 20: The article of footwear of Clause 19, wherein the predetermined location is at or proximate to a midpoint of the casing.

Clause 21: The article of footwear of Clause 19, wherein the predetermined location is disposed between a midpoint of the casing and an end of the casing.

Clause 22: The article of footwear of Clause 19, wherein the casing includes a first end and a second end, the first end disposed proximate to the second end within the outsole when the casing is folded at the predetermined location.

Clause 23: The article of footwear of any of the preceding Clauses, wherein the casing if formed from a flexible material.

Clause 24: The article of footwear of any of the preceding Clauses, wherein the casing is formed from a mesh material.

Clause 25: The article of footwear of any of the preceding Clauses, wherein the casing is formed from a nylon material.

Clause 26: The article of footwear of any of the preceding Clauses, wherein the casing includes stitching to define the predetermined location.

Clause 27: The article of footwear of any of the preceding Clauses, wherein walls of the casing are secured together to define the predetermined location.

Clause 28: The article of footwear of any of the preceding Clauses, wherein walls of the casing are secured together to define at least two pockets each containing a quantity of the particulate matter.

Clause 29: The article of footwear of Clause 28, wherein the at least two pockets include approximately the same quantity of the particulate matter.

Clause 30: The article of footwear of Clause 19, wherein the at least two pockets include different quantities of the particulate matter.

Clause 31: The article of footwear of any of the preceding Clauses, wherein the particulate matter includes foam beads.

Clause 32: The article of footwear of Clause 31, wherein the foam beads include a substantially spherical shape.

Clause 33: The article of footwear of Clause 31, wherein the foam beads include approximately the same size and shape.

Clause 34: The article of footwear of Clause 31, wherein the foam beads include at least one of a different size and shape.

Clause 35: An article of footwear comprising an upper and a midsole attached to the upper and including a footbed and a bottom surface disposed on an opposite side of the midsole than the footbed. The outsole having a ground-engaging surface, an inner surface disposed on an opposite side of the outsole than the ground-engaging surface, and a wall extending from the ground-engaging surface and surrounding the outsole. The casing containing particulate matter and having a length that is greater than a length of the outsole, the casing folded on itself and received within a cavity bounded by the wall of the outsole and between the bottom surface and the inner surface.

Clause 36: The article of footwear of Clause 35, wherein the casing is folded on itself at or proximate to a midpoint of the casing.

Clause 37: The article of footwear of Clause 35, wherein the casing is folded on itself between a midpoint of the casing and an end of the casing.

Clause 38: The article of footwear of Clause 35, wherein the casing includes a first end and a second end, the first end disposed proximate to the second end within the outsole when the casing is folded on itself.

Clause 39: The article of footwear of any of the preceding Clauses, wherein the casing if formed from a flexible material.

Clause 40: The article of footwear of any of the preceding Clauses, wherein the casing is formed from a mesh material.

Clause 41: The article of footwear of any of the preceding Clauses, wherein the casing is formed from a nylon material.

Clause 42: The article of footwear of any of the preceding Clauses, further comprising a predetermined location defining a fold.

Clause 43: The article of footwear of Clause 42, wherein the casing includes stitching to define the predetermined location.

Clause 44: The article of footwear of Clause 42, wherein walls of the casing are secured together to define the predetermined location.

Clause 45: The article of footwear of any of the preceding Clauses, wherein walls of the casing are secured together to define at least two pockets each containing a quantity of the particulate matter.

Clause 46: The article of footwear of Clause 45, wherein the at least two pockets include approximately the same quantity of the particulate matter.

Clause 47: The article of footwear of Clause 45, wherein the at least two pockets include different quantities of the particulate matter.

Clause 48: The article of footwear of any of the preceding Clauses, wherein the particulate matter includes foam beads.

Clause 49: The article of footwear of Clause 48, wherein the foam beads include a substantially spherical shape.

Clause 50: The article of footwear of Clause 48, wherein the foam beads include approximately the same size and shape.

Clause 51: The article of footwear of Clause 48, wherein the foam beads include at least one of a different size and shape.

Clause 52: An article of footwear comprising an upper and a midsole attached to the upper and including a footbed and a bottom surface disposed on an opposite side of the midsole than the footbed. The outsole having a ground-engaging surface, an inner surface disposed on an opposite side of the outsole than the ground-engaging surface, and a wall extending from the ground-engaging surface and surrounding the outsole. The casing containing particulate matter and having a length extending between a first end and a second end, the first end disposed proximate to the second end when the casing is received within a cavity bounded by the wall of the outsole and between the bottom surface and the inner surface.

Clause 53: The article of footwear of Clause 52, wherein the casing is folded on itself at or proximate to a midpoint of the casing.

Clause 54: The article of footwear of Clause 52, wherein the casing is folded on itself between a midpoint of the casing and the first end of the casing.

Clause 55: The article of footwear of any of the preceding Clauses, wherein the casing if formed from a flexible material.

Clause 56: The article of footwear of any of the preceding Clauses, wherein the casing is formed from a mesh material.

Clause 57: The article of footwear of any of the preceding Clauses, wherein the casing is formed from a nylon material.

Clause 58: The article of footwear of any of the preceding Clauses, further comprising a predetermined location defining a fold.

Clause 59: The article of footwear of Clause 58, wherein the casing includes stitching to define the predetermined location.

Clause 60: The article of footwear of Clause 58, wherein walls of the casing are secured together to define the predetermined location.

Clause 61: The article of footwear of any of the preceding Clauses, wherein walls of the casing are secured together to define at least two pockets each containing a quantity of the particulate matter.

Clause 62: The article of footwear of Clause 61, wherein the at least two pockets include approximately the same quantity of the particulate matter.

Clause 63: The article of footwear of Clause 61, wherein the at least two pockets include different quantities of the particulate matter.

Clause 64: The article of footwear of any of the preceding Clauses, wherein the particulate matter includes foam beads.

Clause 65: The article of footwear of Clause 64, wherein the foam beads include a substantially spherical shape.

Clause 66: The article of footwear of Clause 64, wherein the foam beads include approximately the same size and shape.

Clause 67: The article of footwear of Clause 64, wherein the foam beads include at least one of a different size and shape.

Clause 68: A method of making an article of footwear. The method comprising providing a cavity between a footbed and an outsole, providing a casing containing particulate matter, folding the casing at a predetermined location along a length of the casing, and inserting the folded casing into the cavity.

Clause 69: The method of Clause 68, wherein providing the casing includes providing the casing with a length that is greater than a length of the outsole.

Clause 70: The method of Clause 68, wherein folding the casing at the predetermined location includes folding the casing at approximately a midpoint of the casing.

Clause 71: The method of Clause 68, wherein folding the casing at the predetermined location includes folding the casing at a location disposed between a midpoint of the casing and an end of the casing.

Clause 72: The method of Clause 68, wherein inserting the folded casing into the cavity includes positioning a first end of the casing proximate to a second end of the casing.

Clause 73: The method of any of the preceding Clauses, further comprising forming the casing from a flexible material.

Clause 74: The method of any of the preceding Clauses, further comprising forming the casing from a mesh material.

Clause 75: The method of any of the preceding Clauses, further comprising forming the casing from a nylon material.

Clause 76: The method of any of the preceding Clauses, further comprising providing the casing with stitching to define the predetermined location.

Clause 77: The method of any of the preceding Clause, further comprising securing walls of the casing together to define the predetermined location.

Clause 78: The method of any of the preceding Clauses, further comprising securing walls of the casing together to define at least two pockets each containing a quantity of particulate matter.

Clause 79: The method of Clause 79, wherein defining at least two pockets containing a quantity of particulate matter includes defining at least two pockets containing approximately the same quantity of particulate matter.

Clause 80: The method of Clause 79, wherein defining at least two pockets containing a quantity of particulate matter includes defining at least two pockets containing different quantities of particulate matter.

Clause 81: The method of any of the preceding Clauses, wherein providing the casing containing particulate matter includes providing the casing with a quantity of foam beads.

Clause 82: The method of Clause 81, wherein providing the quantity of foam beads includes providing foam beads having a substantially spherical shape.

Clause 83: The method of Clause 81, wherein providing the quantity of foam beads includes providing foam beads having approximately the same size and shape.

Clause 84: The method of Clause 81, wherein providing the quantity of foam beads includes providing foam beads that include at least one of a different size and shape.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An article of footwear comprising:
    an upper;
    a midsole attached to the upper and including a footbed and a bottom surface disposed on an opposite side of the midsole than the footbed;
    an outsole having a ground-engaging surface, an inner surface disposed on an opposite side of the outsole than the ground-engaging surface, and a wall extending from the ground-engaging surface and surrounding the outsole; and
    a tube-shaped casing containing particulate matter and having a uniform cross section extending along a length that is greater than a length of the outsole, the casing (i) including a first fold at a predetermined location along the length where a first portion of an outer surface of the casing is in contact with a second portion of the outer surface of the casing, (ii) received within a cavity bounded by the wall of the outsole and between the bottom surface and the inner surface, and (iii) including a first end and a second end, the first end disposed proximate to the second end within the outsole when the casing is folded at the predetermined location.

2. The article of footwear of claim 1, wherein the predetermined location is at or proximate to a midpoint of the casing.

3. The article of footwear of claim 1, wherein the predetermined location is disposed between a midpoint of the casing and an end of the casing.

4. The article of footwear of claim 1, wherein the casing is formed from at least one of a flexible material, a mesh material, and a nylon material.

5. The article of footwear of claim 1, wherein the casing includes stitching to define the predetermined location.

6. The article of footwear of claim 1, wherein walls of the casing are secured together to define the predetermined location.

7. The article of footwear of claim 1, wherein walls of the casing are secured together to define at least two pockets each containing a quantity of the particulate matter.

8. The article of footwear of claim 7, wherein the at least two pockets include approximately the same quantity of the particulate matter.

9. The article of footwear of claim 7, wherein the at least two pockets include different quantities of the particulate matter.

10. The article of footwear of claim 1, wherein the particulate matter includes foam beads.

11. The article of footwear of claim 10, wherein the foam beads include a substantially spherical shape.

12. The article of footwear of claim 1, further comprising a second fold located along a length of the casing between the predetermined location and the first end of the casing, a third portion of the outer surface of the casing being in contact with a fourth portion of the outer surface of the casing at the second fold.

13. The article of footwear of claim 12, further comprising a third fold located along a length of the casing between the predetermined location and the second end of the casing disposed on an opposite end of the casing than the first end, a fifth portion of the outer surface of the casing being in contact with a sixth portion of the outer surface of the casing at the third fold.

14. An article of footwear comprising:
- an upper;
- a midsole attached to the upper and including a footbed and a bottom surface disposed on an opposite side of the midsole than the footbed;
- an outsole having a ground-engaging surface, an inner surface disposed on an opposite side of the outsole than the ground-engaging surface, and a wall extending from the ground-engaging surface and surrounding the outsole; and
- a tube-shaped casing containing particulate matter and having the same shape along a length that is greater than a length of the outsole, the casing (i) having at least one fold at a predetermined location along the length where a first portion of an outer surface of the casing is in contact with a second portion of the outer surface of the casing, (ii) received within a cavity bounded by the wall of the outsole and between the bottom surface and the inner surface, and (iii) including a first end and a second end, the first end disposed proximate to the second end within the outsole when the casing is folded at the predetermined location.

15. The article of footwear of claim 14, wherein the predetermined location is at or proximate to a midpoint of the casing.

16. The article of footwear of claim 14, wherein the predetermined location is disposed between a midpoint of the casing and an end of the casing.

17. The article of footwear of claim 14, wherein the casing is formed from at least one of a flexible material, a mesh material, and a nylon material.

18. The article of footwear of claim 14, wherein walls of the casing are secured together to define the predetermined location.

* * * * *